(12) United States Patent
Perez de Leon et al.

(10) Patent No.: US 12,442,048 B2
(45) Date of Patent: Oct. 14, 2025

(54) ASSAYS FOR DETECTING MULTIPLE TICK-BORNE PATHOGENS

(71) Applicants: THE UNITED STATES OF AMERICA, AS REPRESENTED BY THE SECRETARY OF AGRICULTURE, Washington, DC (US); THE TEXAS A&M UNIVERSITY SYSTEM, College Station, TX (US)

(72) Inventors: Adalberto A. Perez de Leon, Wake Forest, NC (US); Maria D. Esteve-Gasent, College Station, TX (US); Pamela J. Ferro, Bryan, TX (US); Joseph J. Modarelli, Bluffton, TX (US)

(73) Assignee: THE UNITED STATES OF AMERICA AS REPRESENTED BY THE SECRETARY OF AGRICULTURE, Washington, DC (US)

( * ) Notice: Subject to any disclaimer, the term of this patent is extended or adjusted under 35 U.S.C. 154(b) by 1112 days.

(21) Appl. No.: 17/228,749

(22) Filed: Apr. 13, 2021

(65) Prior Publication Data

US 2021/0230673 A1 Jul. 29, 2021

Related U.S. Application Data

(63) Continuation of application No. 16/130,177, filed on Sep. 13, 2018, now abandoned.

(60) Provisional application No. 62/563,780, filed on Sep. 27, 2017.

(51) Int. Cl.
| | | |
|---|---|---|
| *C12Q 1/68* | (2018.01) | |
| *C07H 21/04* | (2006.01) | |
| *C12Q 1/6806* | (2018.01) | |
| *C12Q 1/686* | (2018.01) | |
| *C12Q 1/689* | (2018.01) | |

(52) U.S. Cl.
CPC ........... *C12Q 1/689* (2013.01); *C12Q 1/6806* (2013.01); *C12Q 1/686* (2013.01); *C12Q 2600/112* (2013.01); *C12Q 2600/16* (2013.01); *C12Q 2600/166* (2013.01)

(58) Field of Classification Search
None
See application file for complete search history.

(56) References Cited

U.S. PATENT DOCUMENTS 6,686,162 B2 * 2/2004 Exner .................... C12Q 1/689
435/6.16
2008/0261206 A1 * 10/2008 Kim ...................... C12Q 1/6837
435/6.15

2016/0281182 A1 9/2016 Monpoeho et al.
2016/0289746 A1 * 10/2016 Parveen ................ C12Q 1/689
2019/0271048 A1 * 9/2019 Zhang .................. C12Q 1/6893

FOREIGN PATENT DOCUMENTS

WO    WO 02/070751    9/2002

OTHER PUBLICATIONS

Steiner et al. (Vector/Pathogen/Host Interaction, Transmission, vol. 45, No. 2, pp. 289-297, Mar. 2008) (Year: 2008).*
Castro et al. (Exp. Appl. Acarol, vol. 66, pp. 443-452, 2015) (Year: 2015).*
Written Opinion on PCT/US2018/051356.
Rudenko, N. et al., 2005, "Improved method of detection and molecular typing of Borrelia burgdorferi sensu lato in clinical samples by polymerase chain reaction without DNA purification," Folia Microbiol. 50 (1): 31-39.
GenBank: CP019916.1 (May 19, 2017) 'Borreliella burgdorferi strain PAbe chromosome, complete genome.
Pabbati, N et al., 2014, "Internal Laboratory Quality Control: Specific Primers for the Genus Borrelia, Borrelia afzelii, and Borrelia garinii," JSM Microbiology, vol. 2, No. 1, 1008, pp. 1-5.
Teal, A. E. et al., 2012, "A New Real-Time PCR Assay for Improved Detect ion of the Parasite Babesia microti," J. Clin. Microbiol. 50 (3): 903-908.
Jaulhac B., et al., 2000, Direct molecular typing of Borrelia burgdorferi Sensu lato species in synovial samples from patients with lyme arthritis, J. Clin. Microbiol. 38(5):1895-1900.
Anderson B.E., et al., 1992, "Detection of the etiologic agent of human ehrlichiosis by polymerase chain reaction," J. Clin. Microbiol. 30(4):775-780.
Nikolausz M. et al., 2009, The single-nucleotide primer extension (SNuPE) method for the multiplex detection of various DNA sequences: from detection of point mutations to microbial ecology, Biochem. Soc. Trans. 37(2):454-459.
D'haene B. et al., 2010, "Accurate and objective copy number profiling using real-time quantitative PCR," Methods 50: 262-270.
Schroeder M.E. et al., 2013, "Development and performance evaluation of a streamlined method for nucleic acid purification, denaturation, and multiplex detection of Bluetongue virus and Epizootic hemorrhagic disease virus," J. Vet. Diag. Invest. 25(6): 709-719.
Marras S.A.E. et al., 2006, "Real-time assays with molecular beacons and other fluorescent nucleic acid hybridization probes," Clinica Chimica Acta 363:48-60.
Williamson, et al., 2010, "Borrelia, Ehrlichia, and Rickettsia spp. in Ticks Removed from Persons, Texas, USA," Emerg. Infect. Dis. 16(3):441-446.

(Continued)

*Primary Examiner* — Jeanine A Goldberg
(74) *Attorney, Agent, or Firm* — SALIWANCHIK, LLOYD & EISENSCHENK

(57) ABSTRACT

Kits, methods, and material for use in detecting tick-borne microorganism(s) are provided herein. One is able to detect DNA from several different species of microorganisms from samples (bodily fluid, tissue, etc.) from ticks and/or mammals to determine if one or more of the microorganisms has infected the tick and/or mammal. The assay uses PCR techniques with a multiple primers and probes. The microorganisms can be in the Borrelial Layer, the Rickettsiales Layer, and/or the Babesial Layer.

8 Claims, 8 Drawing Sheets
Specification includes a Sequence Listing.

(56) References Cited

OTHER PUBLICATIONS

Wen B. et al., 1997, "Comparison of Nested PCR with Immunofluorescent-Antibody Assay for Detection of Ehrlichia canis Infection in Dogs Treated with Doxycycline," J. Clin. Microbiol. 35(7):1852-1855.

Ishikura M. et al., 2003, "Phylogenetic Analysis of Spotted Fever Group Rickettsiae Based on gltA, 17 kDa, and rOmpA Genes Amplified by Nested PCR from Ticks in Japan," Microbiol. Immunol. 47(11):823-832.

* cited by examiner

FIG. 1A

Borrelial Layer - Dual-Labeled Probe: 5'-FAM/BHQ1-3'

*Borrelia burgdorferi*        Gene: *flaB*
- Bb.flaB.161F    AAGAGGGTGTTCAACAGGAAGG      (sense; SEQ ID NO: 1)
- Bb.flaB.213R    GAGAATTAACTCCGCCTTGAGAA     (anti; SEQ ID NO: 2)
- Bb.flaB.186P    TCAACAGCCAGCACCTGCTACAGCA   (sense; SEQ ID NO: 3)
- Amplicon (75bp)
  AAGAGGGTGTTCAACAGGAAGGAGCTCAACAGCCAGCACCTGCTACAGC
  ACCTTCTCAAGGCGGAGTTAATTCTC (SEQ ID NO: 4)

*Borrelia hermsii*        Gene: *flaB*
- Bh-1.flaB.531F GGGCGCAAATCAGGATGAG         (sense; SEQ ID NO: 5)
- Bh-2.flaB.529F GTGGGAGCAAATCAGGATGAG      (sense; SEQ ID NO: 6)
- Bh.flaB.647R   TCCTCTTGCTGTCCTATCTCTTGC    (anti; SEQ ID NO: 7)
- Bh.flaB.615P   AGCCTGAGCRCCTTCACCTGCAAAAAGA (anti; SEQ ID NO: 8)
- Amplicons (117bp / 119bp)
  GGGCGCAAATCAGGATGAGGCAATTGCTGTTAATATTTATGCATCTAATG
  TTGCAAATCTTTTTGCAGGTGAAGGCGCTCAGGCTGCTCCAGTGCAAGAG
  ATAGGACAGCAAGAGGA      (SEQ ID NO: 9)

GTGGGAGCAAATCAGGATGAGGCAATTGCTGTTAATATTTATGCATCTAA
  TGTTGCAAATCTTTTTGCAGGTGAAGGTGCTCAGGCTGCTCCAGAGCAAG
  AGATAGGACAGCAAGAGGA    (SEQ ID NO: 10)

*Borrelia turicatae*        Gene: *bipA*
- Bt.bipA.728F   AGACCGGTACACAGGATTCTAAAGC   (sense; SEQ ID NO: 11)
- Bt.bipA.731F   CCGGCACACAGGATTCTAAAAC       (sense; SEQ ID NO: 12)
- Bt.bipA.869R   GTTCCTGCTCCCTGAATAACATTATC   (anti; SEQ ID NO: 13)
- Bt.bipA.818P   AGTTTTGGGAAGTGTTGTTGGTGGCGT   (sense; SEQ ID NO: 14)
- Amplicon (142bp / 139bp)
  AGACCGGTACACAGGATTCTAAAGCACAATATTCTGATTTTCTGATCAA
  GATATAAGAGATAAAGTTTTGGGAAGTGTTGTTGGTGGCGTTGTAGACAA
  TGTTATGAGTGGAATTGATAATGTTATTCAGGGAGCAGGAAC (SEQ ID NO: 15)

CCGGCACACAGGATTCTAAAACACAATATTCTGATTTTCTGATCAAGAT
  ATAAGAGATAAAGTTTTGGGAAGTGTTGTTGGTGGCGTTGTAGACAATGT
  TATGAGTGGAATTGATAATGTTATTCAGGGAGCAGGAAC (SEQ ID NO: 16)

*Borrelia parkeri*        Gene: *flaB*
- Bp.flaB.406F   TTGTCCAATAAGTCAGCTGCTCAG    (sense; SEQ ID NO: 17)
- Bp.flaB.522R   TCTTAATGTCCATGAAGCTTGTGC    (anti; SEQ ID NO: 18)
- Bp.flaB.443P   CTGAAGAGCTTGGAATGCAACCTGCA (sense; SEQ ID NO: 19)
- Amplicon (117bp)
  TTGTCCAATAAGTCAGCTGCTCAGAATATAAAAACAGCTGAAGAGCTTGG
  AATGCAACCTGCAAAAATTAACACACCAGCATCATTAGCTGGAGCACAA
  GCTTCATGGACATTAAGA      (SEQ ID NO: 20)

FIG. 1B

Rickettsial Layer – Dual-Labeled Probe: 5'-CFO560/BHQ1-3'

*Rickettsia rickettsii*        Gene: hypothetical
- Rr.hyp.724702F   AGAGTAAATCAACGGAAGAGCAAAAC (sense; SEQ ID NO: 21)
- Rr.hyp.724860R   CCCCTCCACTACCTGCATCAT      (anti; SEQ ID NO: 22)
- Rr.hyp.724788P   TCCTCTCCAATCAGCGATTCAGGCA  (sense; SEQ ID NO: 23)
- Amplicon (159bp)
  AGAGTAAATCAACGGAAGAGCAAAACTTTCAATCAGAAGGAGTGGTAAG
  TTCAGTAAGTAAGATGCCAACCATAAATTCTAGTGAGTCCTCTCCAATCA
  GCGATTCAGGCAGTAAGTCAGACTCTGACTCAAAAGATGATGATGCAGG
  TAGTGGAGGGG (SEQ ID NO: 24)

*Anaplasma phagocytophilum*    Gene: *msp2*
- Ap.msp2.420F   GACTTTCCTAGCATGGAGTTGGTT    (sense; SEQ ID NO: 25)
- Ap.msp2.514R   GCGTGCCCTTTTGTAATACCTATAA  (anti; SEQ ID NO: 26)
- Ap.msp2.452P   CATTTCACCTTACACATGCGCCGGA  (sense; SEQ ID NO: 27)
- Amplicon (95bp)
  GACTTTCCTAGCATGGAGTTGGTTAAACTCAACATTTCACCTTACACATGC
  GCCGGAATAGGTGGAAGCGTTATAGGTATTACAAAAGGGCACGC (SEQ ID NO: 28)

*Ehrlichia canis*        Gene: *16S rRNA*
- Ec.16S.61F    GCCTCTGGCTATAGGAAATTGTTAGT  (sense; SEQ ID NO: 29)
- Ec.16S.148R   CTCGGGGATTATACAGTATTACCCAC  (anti; SEQ ID NO: 30)
- Ec.16S.83P    AGATTCCTACGCATTACTCACCCGTCTGC (anti; SEQ ID NO: 31)
- Amplicon (113bp)
  GCCTCTGGCTATAGGAAATTGTTAGTGGCAGACGGGTGAGTAATGCGTAG
  GAATCTACCTAGTAGTACGGAATAGCCATTAGAAATGGTGGGTAATACTG
  TATAATCCCCGAG    (SEQ ID NO: 32)

*Ehrlichia chaffeensis*    Gene: *16S rRNA*
- Ech.16S.64F   GAACGGACAATTGCTTATAACCTTTT  (sense; SEQ ID NO: 33)
- Ech.16S.174R  CCATCATTTCTAATGGCTATTCCATACT  (anti; SEQ ID NO: 34)
- Ec.16S.83P    AGATTCCTACGCATTACTCACCCGTCTGC (anti; SEQ ID NO: 31)
- Amplicon (111bp)
  GAACGGACAATTGCTTATAACCTTTTGGTTATAAATAATTGTTAGTGGCA
  GACGGGTGAGTAATGCGTAGGAATCTACCTAGTAGTATGGAATAGCCATT
  AGAAATGATGG (SEQ ID NO: 35)

*Ehrlichia ewingii*      Gene: *16S rRNA*
- Ew.16S.40F    CGAACGAACAATTCCTAAATAGTCTCT  (sense; SEQ ID NO: 36)
- Ech.16S.174R  CCATCATTTCTAATGGCTATTCCATACT  (anti; SEQ ID NO: 34)
- Ec.16S.83P    AGATTCCTACGCATTACTCACCCGTCTGC (anti; SEQ ID NO: 31)
- Amplicon (114bp)
  CGAACGAACAATTCCTAAATAGTCTCTGACTATTTAGATAGTTGTTAGTG
  GCAGACGGGTGAGTAATGCGTAGGAATCTACCTAGTAGTATGGAATAGC
  CATTAGAAATGATGG   (SEQ ID NO: 37)

FIG. 1C

Babesial Layer – Dual-Labeled Probe: 5'-Q670/BHQ2-3'

*Babesia* spp. (canine)     Gene: *18S rRNA*
- Babsp.18S.65-1F     CGCATTTAGCGATGGACCA     (sense; SEQ ID NO: 38)
- Babsp.18S.67-2F     GCTTTTAGCGATGGACCATTCA     (sense; SEQ ID NO: 77)
- Babsp1.18S.289R     CCTAATTCCCCGTTACCCGTT     (anti; SEQ ID NO: 39)
- Babsp1.18S.228P CATCAGCTTGACGGTAGGGTATTGGCC (sense; SEQ ID NO: 40)
- Amplicon (94bp / 93 bp)
  CGCATTTAGCGATGGACCATTCAAGTTTCTGACCCATCAGCTTGACGGTA
  GGGTATTGGCCTACCGAGGCAGCAACGGGTAACGGGGAATTAGG (SEQ ID NO: 41)

GCTTTTAGCGATGGACCATTCAAGTTTCTGACCCATCAGCTTGACGGTAG
  GGTATTGGCCTACCGAGGCAGCAACGGGTAACGGGGAATTAGG (SEQ ID NO: 78)

Amplification Control for Canines - Dual-Labeled Probe: 5'-TAMRA/BHQ2-3'

NIPcK9 (canine specific)     Gene: *MT-ND5*
- NIPcK9.mt.12942F     GGATTCTACTCCAAAGACCTGATCA     (sense; SEQ ID NO: 42)
- NIPcK9.mt.13018R     GGTTAGGGATGTGGCAACGA     (anti; SEQ ID NO: 43)
- NIPcK9.mt.12980P     CACGTCGAATACCAACGCCTGAGCC (sense; SEQ ID NO: 44)
- Amplicon (96bp)
  GGATTCTACTCCAAAGACCTGATCATCGAGTCCGCTAACACGTCGAATAC
  CAACGCCTGAGCCCTCTTAATTACACTCGTTGCCACATCCCTAACC (SEQ ID NO: 45)

Additional Species Specific Assays

*Borrelia hermsii* GG I   Gene: *flaB*
- Bh-1.flaB.512F GGACATTGAGAGTACATGTGGGC     (sense; SEQ ID NO: 46)
- Bh-1.flaB.646R CCTCTTGCTGTCCTATCTCTTGCA     (anti; SEQ ID NO: 47)
- Bh.flaB.615P    AGCCTGAGCRCCTTCACCTGCAAAAAGA (anti; SEQ ID NO: 8)
- Amplicon (135bp)
  GGACATTGAGAGTACATGTGGGCGCAAATCAGGATGAGGCAATTGCTGT
  TAATATTTATGCATCTAATGTTGCAAATCTTTTTGCAGGTGAAGGCGCTCA
  GGCTGCTCCAGTGCAAGAGATAGGACAGCAAGAGG   (SEQ ID NO: 48)

*Borrelia hermsii* GG II     Gene: *flaB*
- Bh-2.flaB.511F TGGACATTGAGAGTACATGTGGGA     (sense; SEQ ID NO: 49)
- Bh-2.flaB.646R CCTCTTGCTGTCCTATCTCTTGCT     (anti; SEQ ID NO: 50)
- Bh.flaB.615P    AGCCTGAGCRCCTTCACCTGCAAAAAGA (anti; SEQ ID NO: 8)
- Amplicon (136bp)
  TGGACATTGAGAGTACATGTGGGAGCAAATCAGGATGAGGCAATTGCTG
  TTAATATTTATGCATCTAATGTTGCAAATCTTTTTGCAGGTGAAGGTGCTC
  AGGCTGCTCCAGAGCAAGAGATAGGACAGCAAGAGG (SEQ ID NO: 51)

FIG. 1D

*Babesia canis vogeli* Set 1     Gene: *hsp70*
- Bcv.hsp70.384F     GGAAATCGCCGAGCTCTACC    (sense; SEQ ID NO: 52)
- Bcv.hsp70.464R     CGCTGGGAGTCGTTGAAGTAC    (anti; SEQ ID NO: 53)
- Bcv.hsp70.404P     TCGGCAAGACCGTCAAGGATGCC (sense; SEQ ID NO: 54)
- Amplicon (81bp)
  GGAAATCGCCGAGCTCTACCTCGGCAAGACCGTCAAGGATGCCGTCATCACTGTGCCTGCGTACTTCAACGACTCCCAGCG    (SEQ ID NO: 55)

- *Babesia canis vogeli* Set 2    Gene: *hsp70*
  - Bcv.hsp70.372F     CATCAAGATGAAGGAAATCGCC    (sense; SEQ ID NO: 56)
  - Bcv.hsp70.444R     CGCAGGCACAGTGATGACG    (anti; SEQ ID NO: 57)
  - Bcv.hsp70.397P    ATCCTTGACGGTCTTGCCGAGGTAGAG (anti; SEQ ID NO: 58)
  - Amplicon (73bp)
    CATCAAGATGAAGGAAATCGCCGAGCTCTACCTCGGCAAGACCGTCAAGGATGCCGTCATCACTGTGCCTGCG    (SEQ ID NO: 59)

- *Babesia gibsoni*        Gene: *hsp70*
  - Bgib.hsp70.87F    CAATGACCAGGGAAACAGGACT    (sense; SEQ ID NO: 60)
  - Bgib.hsp70.108R   AGCATCACCAATAAGACGCTCAG    (anti; SEQ ID NO: 61)
  - Bgib.hsp70.159P   ACTCCCTCATACGTCGCCTTCACCG   (sense; SEQ ID NO: 62)
  - Amplicon (73bp)
    CAATGACCAGGGAAACAGGACTACTCCCTCATACGTCGCCTTCACCGACACTGAGCGTCTTATTGGTGATGCT (SEQ ID NO: 63)

- *Babesia conradae*       Gene: *18S rRNA*
  - Bcon.18S.480F     TCTGCCGCCGGGACTT     (sense; SEQ ID NO: 64)
  - Bcon.18S.556R     GGCCGAGGCCCAAATTAA     (anti; SEQ ID NO: 65)
  - Bcon.18S.510P   CTTCGTTTTCTCGGTGGCATCCCTCT     (sense; SEQ ID NO: 66)
  - Amplicon (76bp)
    TCTGCCGCCGGGACTTCGTTCCCTTCGGGGCTTCGTTTTCTCGGTGGCATCCCTCTGGTTAATTTGGGCCTCGGCC (SEQ ID NO: 67)

SEQUENCE LISTING

<160> NUMBER OF SEQ ID NOS: 82

<210> SEQ ID NO 1
<211> LENGTH: 22
<212> TYPE: DNA
<213> ORGANISM: Borrelia burgdorferi

<400> SEQUENCE: 1
aagagggtgt tcaacaggaa gg                                           22

<210> SEQ ID NO 2
<211> LENGTH: 23
<212> TYPE: DNA
<213> ORGANISM: Borrelia burgdorferi

<400> SEQUENCE: 2
gagaattaac tccgccttga gaa                                          23

<210> SEQ ID NO 3
<211> LENGTH: 25
<212> TYPE: DNA
<213> ORGANISM: Borrelia burgdorferi

<400> SEQUENCE: 3
tcaacagcca gcacctgcta cagca                                        25

<210> SEQ ID NO 4
<211> LENGTH: 75
<212> TYPE: DNA
<213> ORGANISM: Borrelia burgdorferi

<400> SEQUENCE: 4
aagagggtgt tcaacaggaa ggagctcaac agccagcacc tgctacagca ccttctcaag  60
gcggagttaa ttctc                                                   75

<210> SEQ ID NO 5
<211> LENGTH: 19
<212> TYPE: DNA
<213> ORGANISM: Borrelia hermsii

<400> SEQUENCE: 5
gggcgcaaat caggatgag                                               19

<210> SEQ ID NO 6
<211> LENGTH: 21
<212> TYPE: DNA
<213> ORGANISM: Borrelia hermsii

<400> SEQUENCE: 6
gtgggagcaa atcaggatga g                                            21

<210> SEQ ID NO 7
<211> LENGTH: 24
<212> TYPE: DNA
<213> ORGANISM: Borrelia hermsii

<400> SEQUENCE: 7
tcctcttgct gtcctatctc ttgc                                         24

<210> SEQ ID NO 8
<211> LENGTH: 28
<212> TYPE: DNA
<213> ORGANISM: Artificial Sequence

```
<220> FEATURE:
<223> OTHER INFORMATION: chemically synthesized

<400> SEQUENCE: 8
agcctgagcr ccttcacctg caaaaaga                                              28

<210> SEQ ID NO 9
<211> LENGTH: 117
<212> TYPE: DNA
<213> ORGANISM: Borrelia hermsii

<400> SEQUENCE: 9
gggcgcaaat caggatgagg caattgctgt taatatttat gcatctaatg ttgcaaatct           60
ttttgcaggt gaaggcgctc aggctgctcc agtgcaagag ataggacagc aagagga            117

<210> SEQ ID NO 10
<211> LENGTH: 119
<212> TYPE: DNA
<213> ORGANISM: Borrelia hermsii

<400> SEQUENCE: 10
gtgggagcaa atcaggatga ggcaattgct gttaatattt atgcatctaa tgttgcaaat           60 cttttttgcag gtgaaggtgc tcaggctgct ccagagcaag ataggaca gcaagagga           119

<210> SEQ ID NO 11
<211> LENGTH: 25
<212> TYPE: DNA
<213> ORGANISM: Borrelia turicatae

<400> SEQUENCE: 11
agaccggtac acaggattct aaagc                                                 25

<210> SEQ ID NO 12
<211> LENGTH: 22
<212> TYPE: DNA
<213> ORGANISM: Borrelia turicatae

<400> SEQUENCE: 12
ccggcacaca ggattctaaa ac                                                    22

<210> SEQ ID NO 13
<211> LENGTH: 26
<212> TYPE: DNA
<213> ORGANISM: Borrelia turicatae

<400> SEQUENCE: 13
gttcctgctc cctgaataac attatc                                                26

<210> SEQ ID NO 14
<211> LENGTH: 27
<212> TYPE: DNA
<213> ORGANISM: Borrelia turicatae

<400> SEQUENCE: 14
agttttggga agtgttgttg gtggcgt                                               27

<210> SEQ ID NO 15
<211> LENGTH: 142
<212> TYPE: DNA
<213> ORGANISM: Borrelia turicatae

<400> SEQUENCE: 15
```
agaccggtac acaggattct aaagcacaat attctgattt ttctgatcaa gatataagag    60
ataaagtttt gggaagtgtt gttggtggcg ttgtagacaa tgttatgagt ggaattgata   120
atgttattca gggagcagga ac                                            142

<210> SEQ ID NO 16
<211> LENGTH: 139
<212> TYPE: DNA
<213> ORGANISM: Borrelia turicatae

<400> SEQUENCE: 16
ccggcacaca ggattctaaa acacaatatt ctgattttc tgatcaagat ataagagata    60
aagttttggg aagtgttgtt ggtggcgttg tagacaatgt tatgagtgga attgataatg   120
ttattcaggg agcaggaac                                                139

<210> SEQ ID NO 17
<211> LENGTH: 24
<212> TYPE: DNA
<213> ORGANISM: Borrelia parkeri

<400> SEQUENCE: 17
ttgtccaata agtcagctgc tcag                                          24

<210> SEQ ID NO 18
<211> LENGTH: 24
<212> TYPE: DNA
<213> ORGANISM: Borrelia parkeri

<400> SEQUENCE: 18
tcttaatgtc catgaagctt gtgc                                          24

<210> SEQ ID NO 19
<211> LENGTH: 26
<212> TYPE: DNA
<213> ORGANISM: Borrelia parkeri

<400> SEQUENCE: 19
ctgaagagct tggaatgcaa cctgca                                        26

<210> SEQ ID NO 20
<211> LENGTH: 117
<212> TYPE: DNA
<213> ORGANISM: Borrelia parkeri

<400> SEQUENCE: 20
ttgtccaata agtcagctgc tcagaatata aaaacagctg aagagcttgg aatgcaacct    60
gcaaaaatta acacaccagc atcattagct ggagcacaag cttcatggac attaaga      117

<210> SEQ ID NO 21
<211> LENGTH: 26
<212> TYPE: DNA
<213> ORGANISM: Rickettsia rickettsii

<400> SEQUENCE: 21
agagtaaatc aacggaagag caaaac                                        26

<210> SEQ ID NO 22
<211> LENGTH: 21
<212> TYPE: DNA
<213> ORGANISM: Rickettsia rickettsii

<400> SEQUENCE: 22
cccctccact acctgcatca t                                            21

<210> SEQ ID NO 23
<211> LENGTH: 25
<212> TYPE: DNA
<213> ORGANISM: Rickettsia rickettsii

<400> SEQUENCE: 23
tcctctccaa tcagcgattc aggca                                        25

<210> SEQ ID NO 24
<211> LENGTH: 159
<212> TYPE: DNA
<213> ORGANISM: Rickettsia rickettsii

<400> SEQUENCE: 24
agagtaaatc aacggaagag caaaactttc aatcagaagg agtggtaagt tcagtaagta 60
agatgccaac cataaattct agtgagtcct ctccaatcag cgattcaggc agtaagtcag 120
actctgactc aaaagatgat gatgcaggta gtggaggggg 159

<210> SEQ ID NO 25
<211> LENGTH: 24
<212> TYPE: DNA
<213> ORGANISM: Anaplasma phagocytophilum

<400> SEQUENCE: 25
gactttccta gcatggagtt ggtt 24

<210> SEQ ID NO 26
<211> LENGTH: 25
<212> TYPE: DNA
<213> ORGANISM: Anaplasma phagocytophilum

<400> SEQUENCE: 26
gcgtgccctt ttgtaatacc tataa 25

<210> SEQ ID NO 27
<211> LENGTH: 25
<212> TYPE: DNA
<213> ORGANISM: Anaplasma phagocytophilum

<400> SEQUENCE: 27
catttcacct tacacatgcg ccgga 25

<210> SEQ ID NO 28
<211> LENGTH: 95
<212> TYPE: DNA
<213> ORGANISM: Anaplasma phagocytophilum

<400> SEQUENCE: 28
gactttccta gcatggagtt ggttaaactc aacatttcac cttacacatg cgccggaata 60
ggtggaagcg ttataggtat tacaaaaggg cacgc 95

<210> SEQ ID NO 29
<211> LENGTH: 26
<212> TYPE: DNA
<213> ORGANISM: Ehrlichia canis

<400> SEQUENCE: 29
gcctctggct ataggaaatt gttagt 26

<210> SEQ ID NO 30
<211> LENGTH: 26
<212> TYPE: DNA
<213> ORGANISM: Ehrlichia canis

<400> SEQUENCE: 30
ctcggggatt atacagtatt acccac                                   26

<210> SEQ ID NO 31
<211> LENGTH: 29
<212> TYPE: DNA
<213> ORGANISM: Ehrlichia canis

<400> SEQUENCE: 31
agattcctac gcattactca cccgtctgc                                29

<210> SEQ ID NO 32
<211> LENGTH: 113
<212> TYPE: DNA
<213> ORGANISM: Ehrlichia canis

<400> SEQUENCE: 32
gcctctggct ataggaaatt gttagtggca gacgggtgag taatgcgtag gaatctacct    60
agtagtacgg aatagccatt agaaatggtg ggtaatactg tataatcccc gag          113

<210> SEQ ID NO 33
<211> LENGTH: 26
<212> TYPE: DNA
<213> ORGANISM: Ehrlichia chaffeensis

<400> SEQUENCE: 33
gaacggacaa ttgcttataa cctttt                                    26

<210> SEQ ID NO 34
<211> LENGTH: 28
<212> TYPE: DNA
<213> ORGANISM: Ehrlichia chaffeensis

<400> SEQUENCE: 34
ccatcatttc taatggctat tccatact                                  28

<210> SEQ ID NO 35
<211> LENGTH: 111
<212> TYPE: DNA
<213> ORGANISM: Ehrlichia chaffeensis

<400> SEQUENCE: 35
gaacggacaa ttgcttataa ccttttggtt ataaataatt gttagtggca gacgggtgag   60
taatgcgtag gaatctacct agtagtatgg aatagccatt agaaatgatg g            111

<210> SEQ ID NO 36
<211> LENGTH: 27
<212> TYPE: DNA
<213> ORGANISM: Ehrlichia ewingii

<400> SEQUENCE: 36
cgaacgaaca attcctaaat agtctct                                   27

<210> SEQ ID NO 37
<211> LENGTH: 114
<212> TYPE: DNA
<213> ORGANISM: Ehrlichia ewingii

<400> SEQUENCE: 37
cgaacgaaca attcctaaat agtctctgac tatttagata gttgttagtg gcagacgggt    60
gagtaatgcg taggaatcta cctagtagta tggaatagcc attagaaatg atgg         114

<210> SEQ ID NO 38
<211> LENGTH: 19
<212> TYPE: DNA
<213> ORGANISM: Babesia spp.

<400> SEQUENCE: 38
cgcatttagc gatggacca                                                 19

<210> SEQ ID NO 39
<211> LENGTH: 21
<212> TYPE: DNA
<213> ORGANISM: Babesia spp.

<400> SEQUENCE: 39
cctaattccc cgttacccgt t                                              21

<210> SEQ ID NO 40
<211> LENGTH: 27
<212> TYPE: DNA
<213> ORGANISM: Babesia spp.

<400> SEQUENCE: 40
catcagcttg acggtagggt attggcc                                        27

<210> SEQ ID NO 41
<211> LENGTH: 94
<212> TYPE: DNA
<213> ORGANISM: Babesia spp.

<400> SEQUENCE: 41
cgcatttagc gatggaccat tcaagtttct gacccatcag cttgacggta gggtattggc    60
ctaccgaggc agcaacgggt aacggggaat tagg                                94

<210> SEQ ID NO 42
<211> LENGTH: 25
<212> TYPE: DNA
<213> ORGANISM: Canis lupus

<400> SEQUENCE: 42
ggattctact ccaaagacct gatca                                          25

<210> SEQ ID NO 43
<211> LENGTH: 20
<212> TYPE: DNA
<213> ORGANISM: Canis lupus

<400> SEQUENCE: 43
ggttagggat gtggcaacga                                                20

<210> SEQ ID NO 44
<211> LENGTH: 25
<212> TYPE: DNA
<213> ORGANISM: Canis lupus

<400> SEQUENCE: 44
cacgtcgaat accaacgcct gagcc                                          25

```
<210> SEQ ID NO 45
<211> LENGTH: 96
<212> TYPE: DNA
<213> ORGANISM: Canis lupus

<400> SEQUENCE: 45
ggattctact ccaaagacct gatcatcgag tccgctaaca cgtcgaatac caacgcctga    60
gccctcttaa ttacactcgt tgccacatcc ctaacc                              96

<210> SEQ ID NO 46
<211> LENGTH: 23
<212> TYPE: DNA
<213> ORGANISM: Borrelia hermsii

<400> SEQUENCE: 46
ggacattgag agtacatgtg ggc                                            23

<210> SEQ ID NO 47
<211> LENGTH: 24
<212> TYPE: DNA
<213> ORGANISM: Borrelia hermsii

<400> SEQUENCE: 47
cctcttgctg tcctatctct tgca                                           24

<210> SEQ ID NO 48
<211> LENGTH: 135
<212> TYPE: DNA
<213> ORGANISM: Borrelia hermsii

<400> SEQUENCE: 48
ggacattgag agtacatgtg ggcgcaaatc aggatgaggc aattgctgtt aatatttatg    60
catctaatgt tgcaaatctt tttgcaggtg aaggcgctca ggctgctcca gtgcaagaga   120
taggacagca agagg                                                    135

<210> SEQ ID NO 49
<211> LENGTH: 24
<212> TYPE: DNA
<213> ORGANISM: Borrelia hermsii

<400> SEQUENCE: 49
tggacattga gagtacatgt ggga                                           24

<210> SEQ ID NO 50
<211> LENGTH: 24
<212> TYPE: DNA
<213> ORGANISM: Borrelia hermsii

<400> SEQUENCE: 50
cctcttgctg tcctatctct tgct                                           24

<210> SEQ ID NO 51
<211> LENGTH: 136
<212> TYPE: DNA
<213> ORGANISM: Borrelia hermsii

<400> SEQUENCE: 51
tggacattga gagtacatgt gggagcaaat caggatgagg caattgctgt taatatttat    60
gcatctaatg ttgcaaatct ttttgcaggt gaaggtgctc aggctgctcc agagcaagag   120
ataggacagc aagagg                                                   136
```

<210> SEQ ID NO 52
<211> LENGTH: 20
<212> TYPE: DNA
<213> ORGANISM: Babesia canis vogeli

<400> SEQUENCE: 52
ggaaatcgcc gagctctacc                                                    20

<210> SEQ ID NO 53
<211> LENGTH: 21
<212> TYPE: DNA
<213> ORGANISM: Babesia canis vogeli

<400> SEQUENCE: 53
cgctgggagt cgttgaagta c                                                  21

<210> SEQ ID NO 54
<211> LENGTH: 23
<212> TYPE: DNA
<213> ORGANISM: Babesia canis vogeli

<400> SEQUENCE: 54
tcggcaagac cgtcaaggat gcc                                                23

<210> SEQ ID NO 55
<211> LENGTH: 81
<212> TYPE: DNA
<213> ORGANISM: Babesia canis vogeli

<400> SEQUENCE: 55
ggaaatcgcc gagctctacc tcggcaagac cgtcaaggat gccgtcatca ctgtgcctgc        60
gtacttcaac gactcccagc g                                                  81

<210> SEQ ID NO 56
<211> LENGTH: 22
<212> TYPE: DNA
<213> ORGANISM: Babesia canis vogeli

<400> SEQUENCE: 56
catcaagatg aaggaaatcg cc                                                 22

<210> SEQ ID NO 57
<211> LENGTH: 19
<212> TYPE: DNA
<213> ORGANISM: Babesia canis vogeli

<400> SEQUENCE: 57
cgcaggcaca gtgatgacg                                                     19

<210> SEQ ID NO 58
<211> LENGTH: 27
<212> TYPE: DNA
<213> ORGANISM: Babesia canis vogeli

<400> SEQUENCE: 58
atccttgacg gtcttgccga ggtagag                                            27

<210> SEQ ID NO 59
<211> LENGTH: 73
<212> TYPE: DNA
<213> ORGANISM: Babesia canis vogeli

```
<400> SEQUENCE: 59
catcaagatg aaggaaatcg ccgagctcta cctcggcaag accgtcaagg atgccgtcat    60
cactgtgcct gcg                                                      73

<210> SEQ ID NO 60
<211> LENGTH: 22
<212> TYPE: DNA
<213> ORGANISM: Babesia gibsoni

<400> SEQUENCE: 60
caatgaccag ggaaacagga ct                                            22

<210> SEQ ID NO 61
<211> LENGTH: 23
<212> TYPE: DNA
<213> ORGANISM: Babesia gibsoni

<400> SEQUENCE: 61
agcatcacca ataagacgct cag                                           23

<210> SEQ ID NO 62
<211> LENGTH: 25
<212> TYPE: DNA
<213> ORGANISM: Babesia gibsoni

<400> SEQUENCE: 62
actccctcat acgtcgcctt caccg                                         25

<210> SEQ ID NO 63
<211> LENGTH: 73
<212> TYPE: DNA
<213> ORGANISM: Babesia gibsoni

<400> SEQUENCE: 63
caatgaccag ggaaacagga ctactccctc atacgtcgcc ttcaccgaca ctgagcgtct    60
tattggtgat gct                                                      73

<210> SEQ ID NO 64
<211> LENGTH: 16
<212> TYPE: DNA
<213> ORGANISM: Babesia conradae

<400> SEQUENCE: 64
tctgccgccg ggactt                                                   16

<210> SEQ ID NO 65
<211> LENGTH: 18
<212> TYPE: DNA
<213> ORGANISM: Babesia conradae

<400> SEQUENCE: 65
ggccgaggcc caaattaa                                                 18

<210> SEQ ID NO 66
<211> LENGTH: 26
<212> TYPE: DNA
<213> ORGANISM: Babesia conradae

<400> SEQUENCE: 66
cttcgttttc tcggtggcat ccctct                                        26
```

<210> SEQ ID NO 67
<211> LENGTH: 76
<212> TYPE: DNA
<213> ORGANISM: Babesia conradae

<400> SEQUENCE: 67

```
tctgccgccg ggacttcgtt cccttcgggg cttcgttttc tcggtggcat ccctctggtt    60
aatttgggcc tcggcc                                                    76
```

<210> SEQ ID NO 68
<211> LENGTH: 1416
<212> TYPE: DNA
<213> ORGANISM: Artificial Sequence
<220> FEATURE:
<223> OTHER INFORMATION: chemically synthesized

<400> SEQUENCE: 68

```
atcgcggatc cgcgggacat tgagagtaca tgtgggcgca atcaggatg aggcaattgc      60 tgttaatatt tatgcatcta atgttgcaaa tcttttttgca ggtgaaggcg ctcaggctgc   120
tccagtgcaa gagataggac agcaagagga agcatggaca ttgagagtac atgtgggagc   180
aaatcaggat gaggcaattg ctgttaatat ttatgcatct aatgttgcaa atcttttttgc   240 aggtgaaggt gctcaggctg ctccagagca agagataga cagcaagagg aagtgttgtc    300
caataagtca gctgctcaga atataaaaac agctgaagag cttggaatgc aacctgcaaa   360
aattaacaca ccagcatcat tagctggagc acaagcttca tggacattaa gagtatgaga   420
ccggtacaca ggattctaaa gcacaatatt ctgattttc tgatcaagat ataagagata    480 aagtttttggg aagtgttgtt ggtggcgttg tagacaatgt tatgagtgga attgataatg   540
ttattcaggg agcaggaact gttcaagagg gtgttcaaca ggaaggagct caacagccag   600
cacctgctac agcaccttct caaggcggag ttaattctcc gcggatccgc gatccggaat   660
tccgcgcctc tggctatagg aaattgttag tggcagacgg gtgagtaatg cgtaggaatc   720
tacctagtag tacggaatag ccattagaaa tggtgggtaa tactgtataa tccccgagga   780
gtcgaacgga caattgctta taacctttg gttataaata attgttagtg gcagacgggt   840
gagtaatgcg taggaatcta cctagtagta tggaatagcc attagaaatg atgggtagtc   900
gaacgaacaa ttcctaaata gtctctgact atttagatag ttgttagtgg cagacgggtg   960
agtaatgcgt aggaatctac ctagtagtat ggaatagcca ttagaaatga tgggttatga  1020
ctttcctagc atggagttgg ttaaactcaa catttcacct tacacatgcg ccggaatagg  1080
tggaagcgtt ataggtatta caaaagggca cgccaaagag agtaaatcaa cggaagagca  1140
aaactttcaa tcagaaggag tggtaagttc agtaagtaag atgccaacca taaattctag  1200
tgagtcctct ccaatcagcg attcaggcag taagtcagac tctgactcaa aagatgatga  1260
tgcaggtagt ggaggggccg gaattccggc cggatatccg gcgaatcgct tttagcgatg  1320
gaccattcaa gtttctgacc catcagcttg acggtagggt attggcctac cgaggcagca  1380
acgggtaacg gggaattagg ccggatatcc ggaatt                            1416
```

<210> SEQ ID NO 69
<211> LENGTH: 23
<212> TYPE: DNA
<213> ORGANISM: Borrelia burgdorferi

<400> SEQUENCE: 69

```
aacacaccag catcactttc agg                                            23
```

<210> SEQ ID NO 70
<211> LENGTH: 25
<212> TYPE: DNA
<213> ORGANISM: Borrelia burgdorferi

<400> SEQUENCE: 70
gagaattaac tccgccttga gaagg                                    25

<210> SEQ ID NO 71
<211> LENGTH: 29
<212> TYPE: DNA
<213> ORGANISM: Ehrlichia canis

<400> SEQUENCE: 71
caattattta tagcctctgg ctataggaa                                29

<210> SEQ ID NO 72
<211> LENGTH: 27
<212> TYPE: DNA
<213> ORGANISM: Ehrlichia canis

<400> SEQUENCE: 72
tataggtacc gtcattatct tccctat                                  27

<210> SEQ ID NO 73
<211> LENGTH: 29
<212> TYPE: DNA
<213> ORGANISM: Ehrlichia chaffeensis

<400> SEQUENCE: 73
caattgctta taaccttttg gttataaat                                29

<210> SEQ ID NO 74
<211> LENGTH: 27
<212> TYPE: DNA
<213> ORGANISM: Ehrlichia chaffeensis

<400> SEQUENCE: 74
tataggtacc gtcattatct tccctat                                  27

<210> SEQ ID NO 75
<211> LENGTH: 22
<212> TYPE: DNA
<213> ORGANISM: Anaplasma phagocytophilum

<400> SEQUENCE: 75
ccgctttagt ggcacattat ag                                       22

<210> SEQ ID NO 76
<211> LENGTH: 21
<212> TYPE: DNA
<213> ORGANISM: Anaplasma phagocytophilum

<400> SEQUENCE: 76
ccgaaattct aaaatctggg t                                        21

<210> SEQ ID NO 77
<211> LENGTH: 22
<212> TYPE: DNA
<213> ORGANISM: Babesia spp.

<400> SEQUENCE: 77
gcttttagcg atggaccatt ca                                       22

<210> SEQ ID NO 78
<211> LENGTH: 93
<212> TYPE: DNA
<213> ORGANISM: Babesia spp.

<400> SEQUENCE: 78
gcttttagcg atggaccatt caagtttctg acccatcagc ttgacggtag ggtattggcc    60
taccgaggca gcaacgggta acggggaatt agg    93

<210> SEQ ID NO 79
<211> LENGTH: 235
<212> TYPE: DNA
<213> ORGANISM: Borrelia burgdorferi

<400> SEQUENCE: 79
aacacaccag catcactttc agggtctcaa gcgtcttgga ctttaagagt tcatgttgga    60
gcaacccaag atgaagctat tgctgtaaat atttatgcag ctaatgttgc aaatcttttc   120
tctggtgagg gagctcaaac tgctcaggct gcaccggttc aagagggtgt tcaacaggaa   180
ggagctcaac agccagcacc tgctacagca ccttctcaag gcggagttaa ttctc        235

<210> SEQ ID NO 80
<211> LENGTH: 389
<212> TYPE: DNA
<213> ORGANISM: Ehrlichia canis

<400> SEQUENCE: 80
caattattta tagcctctgg ctataggaaa ttgttagtgg cagacgggtg agtaatgcgt    60
aggaatctac ctagtagtac ggaatagcca ttagaaatgg tgggtaatac tgtataatcc   120 ccgagggga aagatttatc gctattagat gagcctacgt tagattagct agttggtgag   180
gtaatggctt accaaggcta tgatctatag ctggtctgag aggacgatca gccacactgg   240
aactgagata cggtccagac tcctacggga ggcagcagtg gggaatattg acaatgggc    300 gaaagcctga tccagctatg ccgcgtgagt gaagaagscc ttcgggttgt aaaactcttt   360
caatagggaa gataatgacg gtacctata                                     389

<210> SEQ ID NO 81
<211> LENGTH: 390
<212> TYPE: DNA
<213> ORGANISM: Ehrlichia chaffeensis

<400> SEQUENCE: 81
caattgctta taacctttg gttataaata attgttagtg gcagacgggt gagtaatgcg    60
taggaatcta cctagtagta tggaatagcc attagaaatg atgggtaata ctgtataatc   120
cctgcggggg aaagatttat cgctattaga tgagcctacg ttagattagc tagttggtaa   180
ggtaatggct taccaaggct atgatctata gctggtctga ggacgatc agccacactg    240 gaactgagat acggtccaga ctcctacggg aggcagcagt ggggaatatt ggacaatggg   300
cgaaagcctg atccagctat gccgcgtgag tgaagaaggc cttcgggttg taaaactctt   360
tcaataggga agataatgac ggtacctata                                    390

<210> SEQ ID NO 82
<211> LENGTH: 644
<212> TYPE: DNA
<213> ORGANISM: Anaplasma phagocytophilum

```
<400> SEQUENCE: 82
ccgctttagt ggcacattat agtactccga ccctaaaact ttctgatatg aagtacctat        60
atatgccaca gcatttgaga ggaaacggta atttaaacca agtttgagct tgtatgaaag       120
ttgtaaattg gcgtgccctt ttgtaatacc tataacgctt ccacctattc cggcgcatgt       180
gtaaggtgaa atgttgagtt taaccaactc catgctagga aagtcataac acaaattcaa       240
cgtagcagtg gtattcctta tggccataat ctctatcact tcagcaccct caaccgtcaa       300
agcaagagct tttgtgaaaa gaacgctttg cacaatcatc agatccagta aattaaaaaa       360
attatcgctc ctatttctgg gaaaagcccc aacaactttc ttagttttat taactctctt       420
gagttcttct tcctgcatta ccgaaagtct tctcagttga tcatatccta gttctgccac       480
catgtatttt tctatagcga taacattttc acgcgaaaga cttccgatta aatcaatacg       540
atcatagccc ctctgtaaag acaccatcgc tttgtgtttt cctaatacaa agggcatacc       600
accacctttg cggcccttat gtaacccaga ttttagaatt tcgg                       644
```

ASSAYS FOR DETECTING MULTIPLE TICK-BORNE PATHOGENS

CROSS REFERENCE TO RELATED APPLICATIONS

This patent application is a continuation of U.S. Ser. No. 16/130,177, filed Sep. 13, 2018, which claims priority to U.S. Patent Application 62/563,780 filed on Sep. 27, 2017, contents of which are expressly incorporated by reference herein.

BACKGROUND OF THE INVENTION

Sequence Listing

The Sequence Listing submitted via EFS-Web as ASCII compliant text file format (.txt) filed on Sep. 13, 2018, named "SequenceListing_ST25", (created on Sep. 12, 2017, 19 KB), is incorporated herein by reference. This Sequence Listing serves as paper copy of the Sequence Listing required by 37 C.F.R. § 1.821(c) and the Sequence Listing in computer-readable form (CRF) required by 37 C.F.R. § 1.821(e). A statement under 37 C.F.R. § 1.821(f) is not necessary.

FIELD OF THE INVENTION

This invention relates to kits for identifying tick-borne pathogens in a sample, components for those kits, and methods of identifying tick-borne pathogens.

DESCRIPTION OF THE RELATED ART

Ticks are obligate blood sucking ectoparasites of vertebrates particularly mammals and birds. Tick bites cause mechanical damage, irritation, inflammation and hypersensitivity. Infestation with a large number of ticks may cause anemia and reduced productivity. Salivary secretions of some ticks cause toxicosis and paralysis. Hard ticks may affect human and animal health by transmission of numerous tick-borne pathogens. The tick-borne diseases can be caused by viruses, bacteria, or parasites. Most people become infected through tick bites during the spring and summer months. Tick-borne diseases are becoming a serious problem. Lyme disease (LD) and human anaplasmosis have emerged as two of the most common vector born bacterial illnesses in the United States.

LD is the most prevalent arthropod borne disease in the US with over 30,000 cases reported yearly to CDC. LD is transmitted by *Ixodes scapularis* and *I. pacificus*. Mammalian reservoirs are small rodents. LD is caused by the *Borrelia burgdorferi* (Bb), a gram-negative bacterium, and is a multi-phase disorder in humans. Symptoms include fever, headache, fatigue and a characteristic skin rash called erythema migrans. Early LD involves flu-like symptoms, and chronic LD involves arthritis and carditis.

Ehrlichiosis is a zoonotic disease caused by a small, gram-negative bacterium belonging to *Ehrlichia* spp., for example, *Ehrlichia canis* (Ec) and *Ehrlichia chaffeensis* (Ech). Symptoms in humans involve fever, headache, fatigue and muscle aches. These symptoms occur within 1-2 weeks following infection. Anaplasmosis is caused by *Anaplasma phagocytophilium* (Ap), and *A. platys* (which mostly affects canids), a gram-negative, intracellular bacterium. This bacterium targets neutrophils, alters their function in the host and forms morulae within vacuoles. Symptoms in humans include fever, headache, muscle pain, malaise, chills, nausea/abdominal pain, cough and confusion. Severe clinical presentations may include difficulty breathing, hemorrhage, renal failure or neurological problems.

Rocky Mountain Spotted Fever (RMSF) is caused by a gram-negative, intracellular, coccobacillus bacterium, called *Rickettsia rickettsii* (Rr). Typical symptoms include fever, lethargy, abdominal pain, vomiting and muscle pain. A rash is found on 90% of patients with classic RMSF rash developing 2 to 5 days post fever. In addition, other important tick-borne pathogens that infect mammals include *Borrelia hermsii, B. turicatae*, and *B. parkeri* which cause tick-borne relapsing fever (TBRF); and *Babesia canis vogeli, B. gibsoni*, and *B. conradae*.

No diagnostic assay currently exists which allows for quick and inexpensive detection and identification of TBRF pathogens. Prior art qPCR assays are unable to distinguish between *E. canis* and *E. chaffeensis* in a single qPCR assay; two distinct qPCR assays are used to distinguish between these two bacteria. Further, prior art qPCR assays are unable to detect and identify *Borrelia turnicatae*. Most diagnostic laboratories run a "panel of tick-borne pathogens" upon physician or veterinarian request. In most cases, those panels are serological tests that will indirectly determine whether a patient (human or animal) is or was exposed to a particular pathogen.

Current assays to detect these pathogens are inadequate either because the assays are not sensitive enough, not specific enough, not fast enough, and/or are unable to determine if an infection is currently occurring or if the infection occurred days, weeks, or years ago. Jaulhac, et al., *J Clin. Microbiol.* 38(5):1895-1900 (2000) describes an assay for identifying *B. burgdorferi* sensu lato in synovial fluid from arthritic patients. Anderson, et al., *J. Clin. Microbio.* 30(4):775-780 (1992) describes detection of the etiologic agent of human ehrlichiosis using PCR. Nikolausz, et al., *Biochem. Soc. Trans.* 37(2):454-459 (2009) describes using single-nucleotide primer extension (SNuPE) in a multiplex PCR assay to identify point mutations and microbial organisms. Prior art qPCR assays conduct multiple qPCR panels in multiple wells, and use multiple DNA samples in order to screen for all of the pathogens—a process that is costly and extremely time consuming.

An assay that overcomes the limitations of currently known diagnostic assays is needed. A low-cost, quick, and sensitive assay that allows one to differentially diagnose the disease and which detects and allows identification of the causative pathogenic microorganisms is needed.

BRIEF SUMMARY OF THE INVENTION

It is an object of this invention to have a kit for detecting a tick-borne pathogen in a sample obtained from a tick or a mammal. It is a further object of this invention that the kit can detect *Borrelia* species (such as, *B. burgdorferi, B. hermsii, B. turicatae*, and/or *B. parkeri*), *Rickettsia*-like bacteria (such as, *Ehrlichia canis, E. chaffeensis, E. ewingii, Anaplasma phagocytophilum*, and *Rickettsia rickettsii*), and/or *Babesia* species (such as, *Babesia canis vogeli, B. gibsoni, B. canis canis, B. canis rossi, B. caballi, B. odocoilei, B. divergens, B. bigemina*, and *B. conradae*). The kit contains at least one primer set for only one group of pathogens or, alternatively, at least one primer set for each group (or layer) of pathogens, amplification control DNA, optionally PCR reagents, optionally reagents for isolating DNA from a sample, and instructions on using the kit. The amplification control can be a plasmid containing SEQ ID NO: 68 and, if the sample is obtained from a dog, a plasmid containing SEQ ID NO: 45 for which one uses primer set of SEQ ID NOs: 42 and 43 and, optionally, a probe containing SEQ ID NO: 44.

The *Borrelia* group (layer) primer sets can be one or more of the following: (i) SEQ ID NOs: 1 and 2, (ii) SEQ ID NOs: 5 and 7, (iii) SEQ ID NOs: 6 and 7, (iv) SEQ ID NOs: 11 and 13, (v) SEQ ID NOs: 12 and 13, (vi) SEQ ID NOs: 17 and 18, (xiv) SEQ ID NOs: 46 and 47, and (xv) SEQ ID NOs: 49 and 50.

The *Rickettsia*-like bacteria group (layer) primer sets can be one or more of the following: (vii) SEQ ID NOs: 21 and 22, (viii) SEQ ID NOs: 25 and 26, (ix) SEQ ID NOs: 29 and 30, (x) SEQ ID NOs: 33 and 34, and (xi) SEQ ID NOs: 36 and 34.

The *Babesia* species group (layer) primer sets can be one or more of the following: (xii) SEQ ID NOs: 38 and 39, (xiii) SEQ ID NOs: 77 and 39, (xvi) SEQ ID NOs: 52 and 53, (xvii) SEQ ID NOs: 56 and 57, (xviii) SEQ ID NOs: 60 and 61, and (xix) SEQ ID NOs: 64 and 65.

Optionally, a kit contains probes for each layer; and optionally, each probe in each layer contains the same fluorescent label and quencher. For the *Borrelia* layer, the probe(s) contain(s) one of SEQ ID NOs: 3, 8, 14, and 19. For the *Rickettsia*-like bacteria layer, the probe(s) contain(s) one of SEQ ID NOs: 23, 27, and 31. For the *Babesia* layer, the probe(s) contain(s) one of SEQ ID NOs: 40, 54, 58, 62, and 66.

It is another object of this invention to have a kit for detecting a tick-borne pathogen in a sample obtained from a tick or a mammal. It is a further object of this invention that the kit can detect *B. burgdorferi, E. canis, E. chaffeensis,* and/or *A. phagocytophilum* in the sample. The kit contains at least one primer set each pathogen, optionally PCR reagents, optionally reagents for isolating DNA from a sample, and instructions on using the kit. The primer sets for *B. burgdorferi* can be SEQ ID NOs: 69 and 70, or SEQ ID NOs: 1 and 2. The primer set for *E. canis* can be SEQ ID NOs: 71 and 72 or SEQ ID NOs: 29 and 30. The primer set for *E. chaffeensis* can be SEQ ID NOs: 73 and 74 or SEQ ID NOs: 33 and 34. The primer set for *A. phagocytophilum* can be SEQ ID NOs: 75 and 76 or SEQ ID NOs: 25 and 26. It is another object of this invention that this kit can contain a label for detecting any amplicon generated by PCR.

It is a further object of this invention to have methods for detecting tick-borne pathogens in a sample by using some or all of the primers, and optionally some or all of the probes described above in PCR assays. The method can use an amplification control to confirm the accuracy of the PCR assays. One amplification control can be a plasmid containing SEQ ID NO: 68. If the sample is obtained from a dog, another amplification control can be a plasmid containing SEQ ID NO: 45 for which one uses primer set of SEQ ID NOs: 42 and 43 and, optionally, a probe containing SEQ ID NO: 44.

It is another object of this invention to have a plasmid containing SEQ ID NO: 68.

BRIEF DESCRIPTION OF THE DRAWINGS

FIGS. 1A-1D provides the names and sequences of forward and reverse primers and probes for the indicated microorganisms and the amplicon that is generated using the indicated forward and reverse primers. The forward and reverse primers, probe, and amplicon for a canine amplification control is also provided. SEQ ID NOs are provided in FIGS. 1A-1D. The forward primers contain an "F" at the end of their name; reverse primers contain an "R" at the end of their name, and probes contain a "P" at the end of their name. "sense" means oligonucleotide sequences are on the "sense" strand of DNA. "anti" means the oligonucleotide sequences are on the "anti-sense" strand of DNA.

DETAILED DESCRIPTION OF THE INVENTION

Figure 2A:
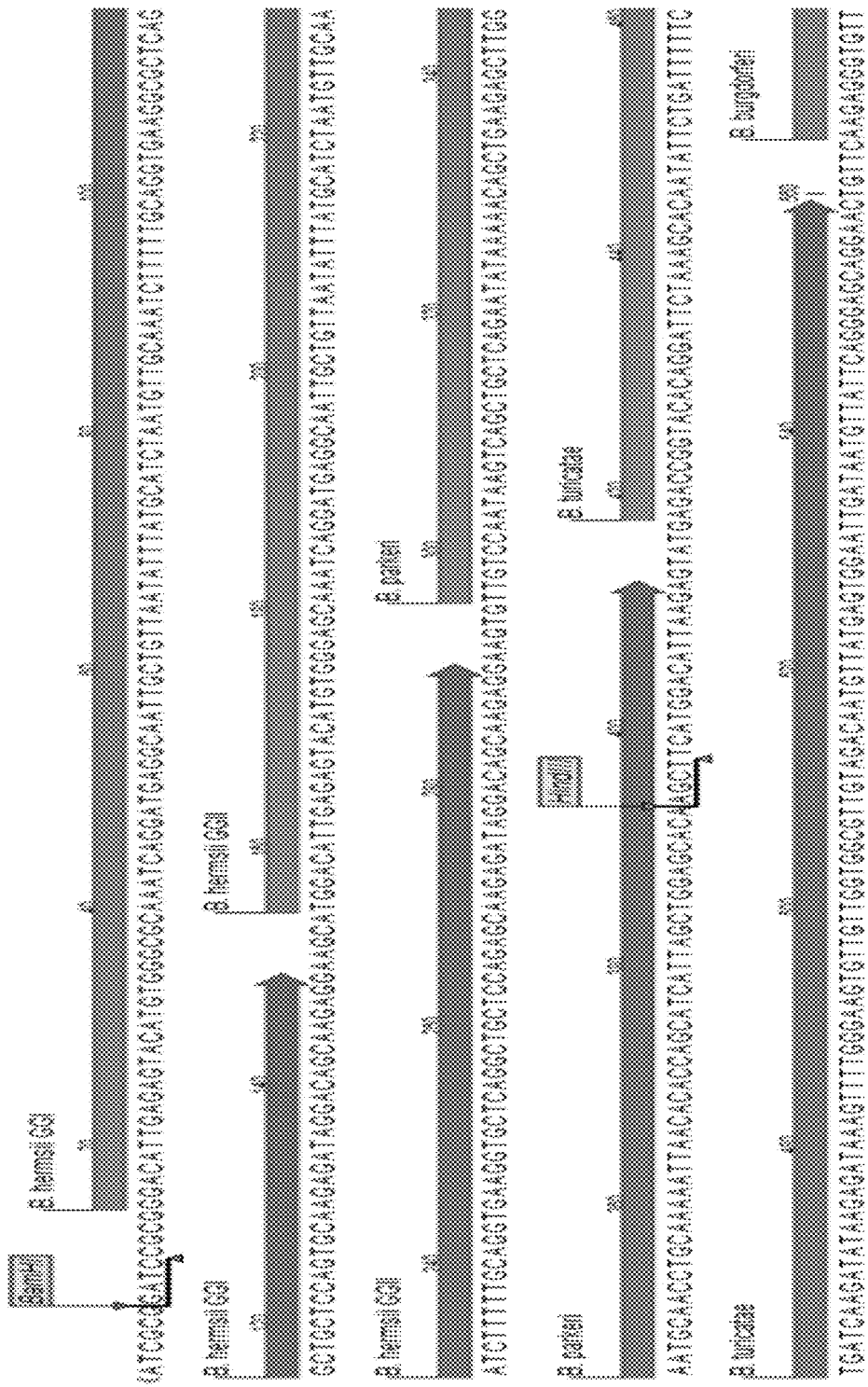
FIGS. 2A-2C provide the sequence of Tick10.PAC polynucleotide (SEQ ID NO: 68) which contains the amplicons for the indicated microorganisms, separated by linkers for ease of cloning.

This invention involves two related PCR (polymerase chain reaction) assays to detect and identify certain tick-borne microorganisms in a sample. One PCR assay is single multiplex PCR for which one separates any amplified DNA on a gel to detect and identify if one, two, three or four different microorganisms are present (referred to as "gel-based PCR" or "gel-based multiplex PCR" assay). The other PCR assay is a single, multiplex, real-time, quantitative PCR (qPCR) assay (uses a single well on a plate) which detects if any of 17 tick-borne microorganisms are present in a sample and identifies the group(s) to which the microorganism(s) belong(s) (referred to as "LayerPlex" assay and as "LayerPlex qPCR" assay). A single LayerPlex qPCR assay detects the presence of a broad spectrum of tick-borne pathogens (17 pathogens) using a single well on a multi-well plate which contrasts with prior art qPCR assays that can screen for only 4-5 targets at one time in one well. A LayerPlex assay utilizes multiple primer sets and one probe (with a fluorescent label and quencher) to label more than one microorganism in a given reaction (generally microorganisms of the same family or genus are grouped together). In particular, in one well of a multi-well plate, one places the primers and probes for three layers (Borrelial, Rickettsiales, and Babesial) as well as the primers and probes for the endogenous internal positive control (NIPcK9, if the sample is obtained from a dog) thereby having a 4 layer assay in each well. LayerPlex permit large number of unique target assays to be grouped under each probe label, up to the qPCR machine's fluorogenic limit (e.g., 11 targets under 4 probe labels). The LayerPlex qPCR assay can be performed in 60 minutes or less, is highly sensitive and specific. Further, it costs much less to perform than prior art assays, including prior art PCR assays.

Based on the results of a LayerPlex assay, a veterinarian or physician can initiate treatment of the patient (human or non-human). However, one may want to further detect and identify the species of the microorganism(s) by conducting additional qPCR assays using the same or similar reaction conditions as the LayerPlex assay and using many of the same primer sets but also a few additional primer sets.

This LayerPlex assay determine if DNA from 17 different tick-borne pathogens (in particular, bacteria and/or protozoa) are present in a sample from an animal. The bacteria which can be detected are *Borrelia burgdorferi*, *B. hermsii*, *B. turicatae*, *B. parkeri*; *Ehrlichia canis*, *E. chaffeensis*, *E. ewingii*, *Anaplasma phagocytophilum*, and *Rickettsia rickettsii*. The protozoa that can be detected are *Babesia canis vogeii*, *B. gibsoni*, *B. canis canis*, *B. canis rossi*, *B. caballi*, *B. odocoilei*, *B. divergens*, and *B. bigemina*. This LayerPlex assay allows for differential diagnosis of the animal's infection so that the person treating the animal can use the appropriate antimicrobial compound(s) to kill the microorganism present. The sample can be from one or more ticks or a mammal (e.g., human, canine, feline, bovine, equine, ovine, caprine, cervid, etc.). The sample can be blood or tissue. In one embodiment, the pathogen is normally present in the particular tissue or blood being tested when the pathogen infects the animal (tick or mammal).

Until now, it has been extremely difficult and expensive to differentiate between *E. canis*, *E. ewingii*, and *E. chaffeensis* in a sample because of their highly similar genome. However, the methods and the kits described herein permit one to distinguish between *E. canis*, *E. ewingii*, and *E. chaffeensis* using a single qPCR assay. No prior art single kit exists which can distinguish between these three *Ehrlichia* species. Using the methods and kits described herein, the medical/scientific community can now easily track the spread of these three *Ehrlichia* species amongst various animals and determine changes in bacteria's ability to infect different animals.

Furthermore, the methods and kits described herein use and contain a primer set that is highly specific and sensitive for detecting *Rickettsia rickettsii*, enabling one to differentiate between the bacteria that causes RMSF and non-pathogenic *Rickettsia* species. This primer set (SEQ ID NOs: 21 and 22) are used to amplify of a portion of Rr genomic DNA that is believed to encode a protein with undetermined activity. This primer set has not previously been used to detect and identify Rr in a sample. Also, this LayerPlex assay uses primer sets that enable detection and identification of *B. hermsii*, *B. turicatae*, and *B. parkeri*, the causative agents of TBRF in North America; another unique aspect of this LayerPlex assay. The combination of the primers used in the methods and in the kits described herein are unique.

One embodiment of this invention involves methods to detect and identify which of any of 17 microorganisms are present in a sample by using the LayerPlex qPCR assay. In this embodiment, the microorganisms are divided into the following three groups or layers: Borrelial Layer (for detecting *B. burgdorferi*, *B. hermsii*, *B. turicatae*, and/or *B. parkeri*), Rickettsiales Layer (for detecting *E. canis*, *E. chaffeensis*, *E. ewingii*, *A. phagocytophilum*, and/or *R. rickettsia*—also referred to as "*Rickettsia*-like" bacteria), and Babesial Layer (for detecting many *Babesia* species, including *B. canis vogeli*, *B. gibsoni*, *B. canis canis*, *B. canis rossi*, *B. caballi*, *B. odocoilei*, *B. divergens*, and *B. bigemina*). DNA is purified from a sample from an animal that is being tested for the presence of one or more of these microorganism. The purified DNA is combined with DNA polymerase, a plurality of appropriate primer sets and probes, and other reagents for performing the LayerPlex qPCR assay. The LayerPlex qPCR assay is conducted, and the Cq values for each sample is measured. One can detect the presence of one or more of these microorganisms' DNA when the Cq value is within specific ranges (described below). In this embodiment of the invention, the plurality of primer sets for detecting *Borrelia* spp. can be one or more of the following:

(i) SEQ ID NOs: 1 and 2 which generate a 75 bp amplicon (SEQ ID NO: 4), (ii) SEQ ID NOs: 5 and 7 which generate a 117 bp amplicon (SEQ ID NO: 9), (iii) SEQ ID NOs: 6 and 7 which generate a 119 bp amplicon (SEQ ID NO: 10), (iv) SEQ ID NOs: 11 and 13 which generate a 142 bp amplicon (SEQ ID NO: 15), (v) SEQ ID NOs: 12 and 13 which generate a 139 bp amplicon (SEQ ID NO: 16), and (vi) SEQ ID NOs: 17 and 18 which generate a 117 bp amplicon (SEQ ID NO: 20).

The plurality of primer sets for detecting *Rickettsia*-like bacteria can be one or more of the following:

(vii) SEQ ID NOs: 21 and 22 which generate a 159 bp amplicon (SEQ ID NO: 24), (viii) SEQ ID NOs: 25 and 26 which generate a 95 bp amplicon (SEQ ID NO: 28), (ix) SEQ ID NOs: 29 and 30 which generate a 113 bp amplicon (SEQ ID NO: 32), (x) SEQ ID NOs: 33 and 34 which generate a 111 bp amplicon (SEQ ID NO: 35), and (xi) SEQ ID NOs: 36 and 34 which generate a 114 bp amplicon (SEQ ID NO: 37).

The plurality of primer set for detecting *Babesia* spp. can be one or more of the following:

(xii) SEQ ID NOs: 38 and 39 which generate a 94 bp amplicon (SEQ ID NO: 41), and (xiii) SEQ ID NOs: 77 and 39 which generate a 93 bn amplicon (SEQ ID NO: 78).

In this embodiment of this invention, the probes are oligonucleotides labeled with a fluorescent label and a quencher. In one embodiment, each oligonucleotide has a sequence of between approximately eight nucleotides and approximately thirty nucleotides of an amplicon defined by each of the plurality of the primer sets (see above). In another embodiment, the probes have a DNA sequence of any of SEQ ID NOs: 3, 8, 14, and 19 for the Borrelial layer; SEQ ID NOs: 23, 27, and 31 for the Rickettsiales layer; and SEQ ID NO: 40 for the Babesial Layer. Each probe within each layer contains the same fluorescent label and quencher; thus all generated amplicons for the microorganisms within each layer will appear as one "signal". The LayerPlex qPCR assay allows one to detect if one or more microorganisms of each layer (Borrelial, Rickettsiales, or Babesial) are present in the sample, but does not permit identification of the specific microorganism. One also includes in the sample the primers and probe for the endogenous internal positive control (NIPcK9, if sample is obtained from a dog). Thus, four "layers" are being assayed in each well of a multi-welled plate.

In an alternative embodiment of the LayerPlex qPCR methods, one can additionally include the following primer sets to identify *Borrelia* spp., (xiv) SEQ ID NOs: 46 and 47 to generate a 135 bp amplicon (SEQ ID NO: 48) and (xv) SEQ ID NOs: 49 and 50 to generate a 136 bp amplicon (SEQ ID NO: 51).

Alternatively, one can use primer sets (xiv) SEQ ID NOs: 46 and 47 and (xv) SEQ ID NOs: 49 and 50 instead of primer sets (ii) SEQ ID NOs: 5 and 7 and (iii) SEQ ID NOs: 6 and 7. Alternatively, one can use only primer set (xiv) SEQ ID NOs: 46 and 47 instead of primer set (ii) SEQ ID NOs: 5 and 7; or only primer set (xv) SEQ ID NOs: 49 and 50 instead of primer set (iii) SEQ ID NOs: 6 and 7. When using primer set (xiv) SEQ ID NOs: 46 and 47 or primer set (xv) SEQ ID NOs: 49 and 50, the probe can have oligonucleotide sequence SEQ ID NO: 8.

Another embodiment of this invention enables one to detect and identify the specific microorganisms for each layer by optionally performing additional qPCR assays. As designed, each of the individual, additional qPCR assays can utilize the same PCR reaction conditions, DNA concentrations, and other parameters as the LayerPlex qPCR assay, thereby lowering the cost, complexity, time to perform these additional qPCR assays while having high specificity and sensitivity. In an alternative embodiment, one can use fluorescent dyes, such as SYBR© Green, instead of probes.

If the Borrelial Layer is positive for the presence of *Borrelia* spp., then one can perform multiple, distinct qPCR assays with the DNA isolated from the sample. For each distinct qPCR assay, one uses only one of the primer sets listed below. One can use the probes having the sequences listed below, or use probes with a different sequence that is present within the indicated amplicon. The probes optionally contain 5'-FAM/BHQ1-3' as the fluorescent label and quencher or other fluorescent labels and quenchers.

Because each qPCR reaction contains only one set of primers and the accompanying probe, one can detect and identify the particular species using the same fluorescent label.

(i) SEQ ID NOs: 1 and 2 to generate a 75 bp *B. burgdorferi* amplicon (SEQ ID NO: 4) and, optionally, SEQ ID NO: 3 for the probe's oligonucleotide,
  (ii) SEQ ID NOs: 5 and 7 to generate a 117 bp *B. hermsii* amplicon (SEQ ID NO: 9) and, optionally SEQ ID NO: 8 for the probe's oligonucleotide, or (iii) SEQ ID NOs: 6 and 7 to generate a 119 bp *B. hermsii* amplicon (SEQ ID NO: 10) and, optionally SEQ ID NO: 8 for the probe's oligonucleotide, or (xiv) SEQ ID NOs: 46 and 47 to generate a 135 bp *B. hermsii* gene group I (GG I) amplicon (SEQ ID NO: 48) and, optionally, SEQ ID NO: 8 for the probe's oligonucleotide, or (xv) SEQ ID NOs: 49 and 50 to generate a 136 bp *B. hermsii* gene group II (GG II) amplicon (SEQ ID NO: 51) and, optionally, SEQ ID NO: 8 for the probe's oligonucleotide, or two, three, or four of the primer sets and probes in distinct qPCR assays,
  (iv) SEQ ID NOs: 11 and 13 to generate a 142 bp *B. turicatae* amplicon (SEQ ID NO: 15) and, optionally, SEQ ID NO: 14 for the probe's oligonucleotide or (v) SEQ ID NOs: 12 and 13 to generate a 139 bp *B. turicatae* amplicon (SEQ ID NO: 16) and, optionally, SEQ ID NO: 14 for the probe's oligonucleotide, or both sets of primers in distinct qPCR assays, and
  (vi) SEQ ID NOs: 17 and 18 to generate a 117 bp *B. parkeri* amplicon (SEQ ID NO: 20) and, optionally, SEQ ID NO: 19 for the probe's oligonucleotide.

If the Rickettsiales Layer is positive for one or more *Rickettsia*-like bacteria, one may conduct multiple, distinct qPCR assays with the DNA isolated from the sample. For each distinct qPCR assay, one uses only one of the primer sets listed below. One can use the probes having the sequences provided below, or use probes with a different sequence that is present within the indicated amplicon. The probes optionally contain 5'-CFO560/BHQ1-3' as the fluorescent label and quencher or other fluorescent labels and quenchers. Because each qPCR reaction contains only one set of primers and the accompanying probe, one can detect and identify the particular species using the same fluorescent label.

(vii) SEQ ID NOs: 21 and 22 to generate a 159 bp *R. rickettsii* amplicon (SEQ ID NO: 24) and, optionally, SEQ ID NO: 23 for the probe's oligonucleotide;
  (viii) SEQ ID NOs: 25 and 26 to generate a 95 bp *A. phagocytophilum* amplicon (SEQ ID NO: 28) and, optionally, SEQ ID NO: 27 for the probe's oligonucleotide;
  (ix) SEQ ID NOs: 29 and 30 to generate a 113 bp *E. canis* amplicon (SEQ ID NO: 32) and, optionally, SEQ ID NO: 31 for the probe's oligonucleotide;
  (x) SEQ ID NOs: 33 and 34 to generate a 111 bp *E. chaffeensis* amplicon (SEQ ID NO: 35) and, optionally, SEQ ID NO: 31 for the probe's oligonucleotide; and
  (xi) SEQ ID NOs: 36 and 34 to generate a 114 bp *E. ewingii* amplicon (SEQ ID NO: 37) and, optionally, SEQ ID NO: 31 for the probe's oligonucleotide.

If the Babesial Layer is positive for one or more microorganism, one may conduct multiple, distinct qPCR assays with the DNA isolated from the sample. For each distinct qPCR assay, one uses only one of the primer sets listed below. One can use the probes having the sequences provided below, or use probes with a different sequence that is present within the indicated amplicon. The probe optionally contains 5'-Q670/BHQ2-3' as the fluorescent label and quencher or other fluorescent labels and quenchers. Because each qPCR reaction contains only one set of primers and the accompanying probe, one can detect and identify the particular species using the same fluorescent label. It is noted that this qPCR assay can detect and identify *B. conradae* in a sample by using the primer set of SEQ ID NOs: 64 and 65; but that the LayerPlex qPCR assay does not detect and identify *B. conradae* within the Babesial Layer.

(xvi) SEQ ID NOs: 52 and 53 to generate a 81 bp *B. canis vogeli* amplicon (SEQ ID NO: 55), and, optionally, SEQ ID NO: 54 for the probe's oligonucleotide or (xvii) SEQ ID NOs: 56 and 57 to generate a 73 bp *B. canis vogeli* amplicon (SEQ ID NO: 59), and, optionally, SEQ ID NO: 58 for the probe's oligonucleotide, or both sets of primers and probes in distinct qPCR assays,
  (xviii) SEQ ID NOs: 60 and 61 to generate a 73 bp *B. gibsoni* amplicon (SEQ ID NO: 63), and, optionally, SEQ ID NO: 62 for the probe's oligonucleotide, and
  (xix) SEQ ID NOs: 64 and 65 to generate a 76 bp *B. conradae* amplicon (SEQ ID NO: 67), and, optionally, SEQ ID NO: 66 for the probe's oligonucleotide.

In another embodiment of this LayerPlex qPCR assay and the additional, follow-up single qPCR assays, one uses one or more positive and/or negative controls (also referred to as "amplification controls") to verify that the qPCR assay results are accurate. One amplification control is specific for the animal from which the sample was obtained. For example, if the sample is obtained from a dog, cat, bovine, equine, cervid, etc., an amplification control contains DNA specific for that animal and confirms that the sample contains DNA from that animal. In one embodiment, the amplification control for a canine sample utilizes a NIPcK9 amplicon (SEQ ID NO: 45), primer set (SEQ ID NOs: 42 and 43), and probe (SEQ ID NO: 44). The other amplification control is specific for the primer sets used and thus could be Tick10.PAC (SEQ ID NO: 68) shown in FIGS. 2A-2C which contains some or all of the amplicons of the tick-borne pathogens listed in FIGS. 1A-1D. For samples from an animal that is not a canine (domestic dog, wolf, coyote, etc.) one can use primers and a probe that are derived from that animal's genome (nucleic or mitochondrial) and are specific for that animal.

Another embodiment of this invention involves a kit for detecting one or more tick-borne microorganisms (*Borrelia* spp., *Rickettsia*-like bacteria, and/or *Babesia* spp.) in a sample containing a plurality of primers sets. This kit contains a plurality of primer sets, instructions for use, and optionally, probes. In this kit, the primer sets for detecting *Borrelia* spp. can be one or more of the following:

(i) SEQ ID NOs: 1 and 2,
(ii) SEQ ID NOs: 5 and 7,
(iii) SEQ ID NOs: 6 and 7,
(iv) SEQ ID NOs: 11 and 13,
(v) SEQ ID NOs: 12 and 13, and
(vi) SEQ ID NOs: 17 and 18.

The primer sets for detecting *Rickettsia*-like bacteria can be one or more of the following:

(vii) SEQ ID NOs: 21 and 22,
(viii) SEQ ID NOs: 25 and 26,
(ix) SEQ ID NOs: 29 and 30,
(x) SEQ ID NOs: 33 and 34, and
(xi) SEQ ID NOs: 36 and 34.

The primer set for detecting *Babesia* spp. can be one or more of the following:

(xii) SEQ ID NOs: 38 and 39, and
(xiii) SEQ ID NOs: 77 and 39.

The probes in this kit are oligonucleotides labeled with a fluorescent label and a quencher. In one embodiment, each oligonucleotide has a sequence of between approximately eight nucleotides and approximately thirty nucleotides of an amplicon defined by each of the plurality of the primer sets. The amplicons are provided in FIGS. 1A-1D and discussed above. In another embodiment, the probes have a DNA sequence of any of SEQ ID NOs: 3, 8, 14, 19, 23, 27, 31, and 40.

In another embodiment, the kit can contain additional primer sets for detecting *Borrelia* spp. of at least one of the following:

(xiv) SEQ ID NOs: 46 and 47, and
(xv) SEQ ID NOs: 49 and 50.

The probes in this kit are oligonucleotides labeled with a fluorescent label and a quencher. In one embodiment, each oligonucleotide has a sequence of between approximately eight nucleotides and approximately thirty nucleotides of an amplicon defined by each of the plurality of the primer sets. The amplicons are provided in FIGS. 1A-1D and discussed above. In another embodiment, the probes have a DNA sequence of any of SEQ ID NOs: 48 and 51.

In another embodiment, the kit can contain additional primer sets for detecting *Babesia* spp. of at least one of the following:

(xvi) SEQ ID NOs: 52 and 53,
(xvii) SEQ ID NOs: 56 and 57,
(xviii) SEQ ID NOs: 60 and 61, and
(xix) SEQ ID NOs: 64 and 65.

The probes in this kit are oligonucleotides labeled with a fluorescent label and a quencher. In one embodiment, each oligonucleotide has a sequence of between approximately eight nucleotides and approximately thirty nucleotides of an amplicon defined by each of the plurality of the primer sets. The amplicons are provided in FIGS. 1A-1D and discussed above. In yet another embodiment, the probes have a DNA sequence of any of SEQ ID NOs: 54, 58, 62, and 66.

In another embodiment, the kit can contain a recombinant plasmid that contains SEQ ID NO: 68 (Tick10.PAC plasmid). Alternatively, the kit can contain Tick10.PAC (SEQ ID NO: 68) as an amplicon. This kit can optionally contain a recombinant plasmid containing the NIPcK9 amplicon (SEQ ID NO: 45) or the NIPcK9 amplicon itself, a primer set of SEQ ID NOs: 42 and 43, and optionally a probe which contains an oligonucleotide containing between approximately eight nucleotides and approximately thirty nucleotides of SEQ ID NO: 45. Alternatively, the probe can have the sequence of SEQ ID NO: 44. In another embodiment, the kit can contain one or more amplification control plasmids for validating the proper functioning of the qPCR assay. The amplification control plasmids contain at least one sequence being tested and a sequence that is specific from the animal from which a sample was obtained (tick, dog, cat, equine, bovine, ovine, deer elk, moose, buffalo, etc.). In another embodiment, a kit contains any of the above described primers and probes sets so that one can be used to test for specifically desired sets of microorganisms.

Figure 2B:
Figure 2C:
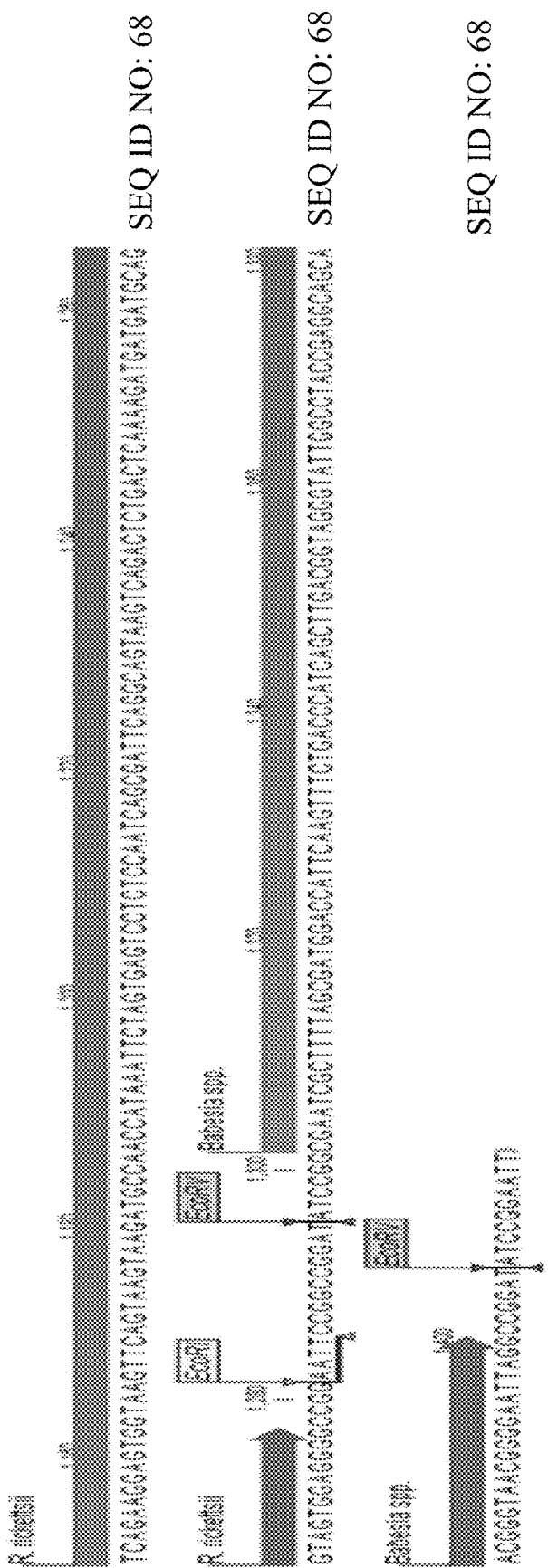

The primer sets, the amplicons generated, and the probes useful for these LayerPlex PCR and follow-up multiplex qPCR assay embodiments are contained in FIGS. 1A-1D and in FIGS. 2A-2C. In this embodiment, one can use the fluorescent labels and quenchers for the probes listed in FIGS. 1A-1D. In an alternative embodiment, one can use known in the art fluorescent labels and quenchers for the probes listed in FIGS. 1A-1D or other types of labels for detecting the amplicons.

In another embodiment, a kit can also contain equipment and instructions for collecting a sample (bodily fluids or tissue) from a subject, reagents and instructions for isolating DNA from the sample, and/or reagents and instructions for performing PCR. In another embodiment, the generated amplicons can be isolated and sequenced.

As discussed above, another embodiment of this invention involves a multiplex PCR assay that detects and identifies *B. burgdorferi, E. canis, E. chaffeensis*, and/or *A. phagocytophilum* in a sample (bodily fluid, tissue, or combination thereof from a mammal or tick). In one embodiment, DNA isolated from a sample is mixed with primer sets that bind to genomic DNA from *B. burgdorferi, E. canis, E. chaffeensis*, and/or *A. phagocytophilum*. After amplification of DNA via PCR, the DNA is run on a gel. One can stain the gel or use other types of molecules to identify the size of any amplicons that are generated by the PCR assay, and thus detect the presence of DNA from any one of these four microorganisms, indicating that the sample contains those detected microorganisms. In one embodiment of this gel-based multiplex PCR assay method, one can use any combination of the primer sets as follows:

(a)(i) SEQ ID NOs: 69 and 70 to generate a 235 bp *B. burgdorferi* amplicon (SEQ ID NO: 79) and/or
(a)(ii) SEQ ID NOs: 1 and 2 to generate a 75 bp *B. burgdorferi* amplicon (SEQ ID NO: 4);
(b)(i) SEQ ID NOs: 71 and 72 to generate a 389 bp *E. canis* amplicon (SEQ ID NO: 80) and/or (b)(ii) SEQ ID NOs: 29 and 30 to generate a 113 bp *E. canis* amplicon (SEQ ID NO: 32);
(c)(i) SEQ ID NOs: 73 and 74 to generate a 390 bp *E. chaffeensis* amplicon (SEQ ID NO: 81) and/or (c)(ii) SEQ ID NOs: 33 and 34 to generate a 111 bp *E. chaffeensis* amplicon (SEQ ID NO: 35); and
(d)(i) SEQ ID NOs: 75 and 76 to generate a 644 bp *A. phagocytophilum* amplicon (SEQ ID NO: 82) and/or
(d)(ii) SEQ ID NOs: 25 and 26 to generate a 95 bp *A. phagocytophilum* amplicon (SEQ ID NO: 28).

In another embodiment of this invention, one can use real-time qPCR to detect one or more of *B. burgdorferi, E. canis, E. chaffeensis*, and/or *A. phagocytophilum* using the above sets of primers and appropriate probes that contain fluorescent labels that are distinct for each organism. Each probe would contain an oligonucleotide having a sequence of between approximately eight to approximately 30 nt in length and that is contained within the above indicated amplicon. In one embodiment, the probes can contain SEQ ID NOs: 3 (for *B. burgdorferi*), 31 (for *E. canis* and/or *E. chaffeensis*), and 27 (for *A. phagocytophilum*) when one uses the primer sets SEQ ID NOs: 1 and 2, SEQ ID NOs: 29 and 30, SEQ ID NOs: 33 and 34, and SEQ ID NOs: 25 and 26, respectively.

Another embodiment of this invention involves a kit containing at least one of each primers set described below, instructions for use of the primers to detect one or more of these tick-borne bacteria (as well as for using any other optional portions of this kit), optionally equipment for obtaining a sample (bodily fluids or tissue) from an animal, optionally reagents for purifying DNA from the sample obtained from an animal, optionally reagents for performing PCR, optionally labels (dyes, radioisotopes, probes, etc.) for detecting the amplicons generated, and optionally the amplicons described below, which are all useful for detecting *B. burgdorferi*, *E. canis*, *E. chaffeensis*, and *A. phagocytophilum*; the primer sets and amplicons being as follows:

(a)(i) SEQ ID NOs: 69 and 70 to generate a 235 bp *B. burgdorferi* amplicon (SEQ ID NO: 79) and/or (a)(ii) SEQ ID NOs: 1 and 2 to generate a 75 bp *B. burgdorferi* amplicon (SEQ ID NO: 4);

(b)(i) SEQ ID NOs: 71 and 72 to generate a 389 bp *E. canis* amplicon (SEQ ID NO: 80) and/or (b)(ii) SEQ ID NOs: 29 and 30 to generate a 113 bp *E. canis* amplicon (SEQ ID NO: 32);

(c)(i) SEQ ID NOs: 73 and 74 to generate a 390 bp *E. chaffeensis* amplicon (SEQ ID NO: 81) and/or (c)(ii) SEQ ID NOs: 33 and 34 to generate a 111 bp *E. chaffeensis* amplicon (SEQ ID NO: 35); and (d)(i) SEQ ID NOs: 75 and 76 to generate a 644 bp *A. phagocytophilum* amplicon (SEQ ID NO: 82) and/or (d)(ii) SEQ ID NOs: 25 and 26 to generate a 95 bp *A. phagocytophilum* amplicon (SEQ ID NO: 28).

In one embodiment, the probes can contain SEQ ID NOs: 3 (for *B. burgdorferi*), 31 (for *E. canis* and/or *E. chaffeensis*), and 27 (for *A. phagocytophilum*) when one uses the primer sets SEQ ID NOs: 1 and 2, SEQ ID NOs: 29 and 30, SEQ ID NOs: 33 and 34, and SEQ ID NOs: 25 and 26, respectively.

An embodiment of the invention involves assays to detect, in a single reaction qPCR assay, multiple pathogens that cause a plurality of diseases and provide fast and specific diagnostic tools that allow the detection of co-infections. The assays described herein can be performed on different samples, for example, various tissues or bodily fluids obtained from an animal (tick or mammal). The assays of the invention permit the detection of the pathogens in less than one hour after the extraction of DNA from the samples and initiating the qPCR assay. This period of time is less than the period of time required to perform currently for known in the art qPCR assays. As such, the invention advances diagnostic medicine.

The sample being tested in this invention can be a tick (fluid(s) and/or tissue(s)). In one embodiment, the tick fed on a mammal, for example, a dog. In another embodiment, the tick is obtained in areas where mammals live. The sample can also be a tissue sample or bodily fluid sample from a human or a non-human mammal, such as but not limited to, dog, cat, bovine, equine, ovine, cervid, goat, primate, llama, buffalo, etc.

Non-limiting examples of tissue are rumen, reticulum, brain, eye(s), pineal gland, pituitary gland, thyroid gland, parathyroid glands, thorax, heart, lung, esophagus, thymus gland, pleura, adrenal gland(s), appendix, gall bladder, urinary bladder, large intestine, small intestine, kidney(s), liver, pancreas, spleen, stoma, ovary/ovaries, uterus, testis, skin, and buffy coat sample of blood. Additional examples of organs and tissue are well-known to a person of ordinary skill in the art, and such embodiments are within the purview of the invention. Similarly, non-limiting examples of the bodily fluid samples include amniotic fluid, aqueous humor, vitreous humor, bile, blood, cerebrospinal fluid, chyle, endolymph, perilymph, lymph, mucus (including nasal drainage and phlegm), pericardial fluid, peritoneal fluid, pleural fluid, pus, rheum, saliva, sputum, synovial fluid, vaginal secretion, semen, blood, serum or plasma. Additional examples of bodily fluids are well known to a person of ordinary skill in the art, and such embodiments are within the purview of the invention.

As used herein, the singular forms "a", "an" and "the" are intended to include the plural forms as well, unless the context clearly indicates otherwise. Further, to the extent that the terms "including", "includes", "having", "has", "with", or variants thereof are used in either the detailed description and/or the claims, such terms are intended to be inclusive in a manner similar to the term "comprising".

The term "about" or "approximately" means within an acceptable error range for the particular value as determined by one of ordinary skill in the art, which will depend in part on how the value is measured or determined, i.e., the limitations of the measurement system. For example, "about" can mean within 1 or more than 1 standard deviation, per the practice in the art. Alternatively, "about" can mean a range of up to 0 to 10%, 0 to 5%, or up to 1% of a given value. Alternatively, particularly with respect to biological systems or processes, the term can mean within an order of magnitude, preferably within 5-fold, and more preferably within 2-fold, of a value. Where particular values are described in the application and claims, unless otherwise stated the term "about" meaning within an acceptable error range for the particular value should be assumed. In the context of compositions containing amounts of ingredients where the terms "about" or "approximately" are used, these compositions contain the stated amount of the ingredient with a variation (error range) of 0-10% around the value (X±10%). Ranges are stated in shorthand, so as to avoid having to set out at length and describe each and every value within the range. Any appropriate value within the range can be selected, where appropriate, as the upper value, lower value, or the terminus of the range. For example, a range of 0.1-1.0 represents the terminal values of 0.1 and 1.0, as well as the intermediate values of 0.2, 0.3, 0.4, 0.5, 0.6, 0.7, 0.8, 0.9, and all intermediate ranges encompassed within 0.1-1.0, such as 0.2-0.5, 0.2-0.8, 0.7-1.0, etc. When ranges are used herein, such as for dose ranges, combinations and sub-combinations of ranges (e.g., sub-ranges within the disclosed range), specific embodiments therein are intended to be explicitly included.

One embodiment of PCR is performed with a template DNA or RNA and one or more primers that are designed to amplify a target amplicon, which is a portion of the template DNA or RNA, with a polymerase. PCR involves temperature cycles that are designed to facilitate different steps in a polymerase reaction leading to the amplification of the target amplicon. The reagent mixture for PCR typically contains deoxyribonucleotides (also called "nucleotides") (dNTPs), metal ions (e.g., $Mg^{2+}$, $Mn^{2+}$), and a buffer. Additional details, for example, additional reagents which may be used in a PCR or temperature cycles that can be used in a particular PCR can be known by a person of ordinary skill in the art.

qPCR typically quantifies the amount of amplicon(s) present in the sample. The amplicon can be detected by a number of different methods, and such detection is typically carried out in real-time ("RT"). As such, qPCR is also referred to "RT-qPCR". Certain aspects of qPCR are described in "Real-Time PCR Application Guide", Biorad 2006, the contents of which are herein incorporated by reference in its entirety. The multiplex PCR assays of this invention can also be multiplex qPCR assays. When performing qPCR, one is monitoring DNA amplification (or amplicon production) during each cycle of PCR using a label. When the DNA in the sample is in the log linear phase of amplification, the amount of fluorescence increases above the background. The point at which the fluorescence becomes measurable is called the quantification cycle ("Cq") or crossing point. By using multiple dilutions of a known amount of standard DNA or amplification control DNA, a standard curve can be generated of log concentration against Cq. The amount of nucleic acids in an unknown sample can then be calculated from its Cq value. For this invention, the higher the Cq value, the smaller the quantity of a particular microorganism's DNA or DNA from a group of microorganisms is present in the assayed liquid. Conversely, the lower the Cq value, the higher the quantity of a microorganism's DNA or DNA from a group of microorganisms is present in the assayed liquid.

A multiplex PCR assay refers to a PCR assay designed to amplify multiple amplicons from one or more template DNAs or RNAs in one reaction. Typically, multiple pairs of primers are added to a reaction that amplifies different target regions in the template DNA or RNA with each primer pairs being used to generate a distinct amplicon; that is, each amplicon generated by a primer pair has a different sequence from the other amplicons generated by the other primer pairs. One can determine if one or more of the distinct amplicons are present in the PCR assay using different types of identification modes (detection methods), such as gels, fluorescent dyes, isotopes, etc. In one embodiment, the invention involves a multiplex PCR assay for which the resultant amplicons are run on a gel and then identified using an intercalating dye or sequenced or by some other known in the art method.

As mentioned above, a LayerPlex qPCR assay is a type of multiplex PCR assay that uses primer pairs to generate an amplicon which determines if polynucleotides from any member of a particular layer are present. For this invention, the LayerPlex identifies if DNA from specific microorganisms within a group/layer of pathogens are present in the sample. More particularly, the layers are (1) Borrelial Layer which can identify if DNA from *B. burgdorferi, B. hermsii, B. turicatae*, and/or *B. parkeri* are present in the sample, (2) Rickettsiales Layer which can identify if DNA from *E. canis, E. chaffeensis, E. ewingii, A. phagocytophilum*, and/or *R. rickettsii* are present in the sample, and (3) Babesial Layer which can identify if DNA from *B. canis vogeli, B. gibsoni, B. canis canis, B. canis rossi, B. caballi, B. odocoilei, B. divergens*, and *B. bigemina* are present in the sample.

In general, two types of labels can be used with qPCR. One label is an intercalating dye that incorporates into double-stranded DNA, such as SYBR® Green. The second type of label is a "probe" that binds specifically to the target DNA, such as TaqMan® probes, Molecular Beacons™, or Scorpion primers. The probe is an oligonucleotide with a fluorescent dye (such as Texas Red®, FAM, TET, HEX, TAMRA, JOE, and ROX) and a quencher (such as Black hole quencher (BHQ), Dabcyl, Dabsyl, and the minor groove binding nonfluorescent quencher (MGBNFQ)) chemically attached to the oligonucleotide. The oligonucleotide itself has no significant fluorescence, but fluoresces either when annealed to the template (as in Molecular Beacons™) or when the dye is clipped from the oligonucleotide during extension (as in TaqMan® probes). The fluorescent compositions described herein are simply examples of compositions for imaging, identifying, and/or quantifying DNA. Instead of the fluorescent compositions described herein, one can label DNA with compositions that are known in the art (some of which are described infra) or that are developed in the future. These labels can be used to image, identify, and/or quantify DNA using similar methods as described herein. The fluorescent compositions are simply one well-known and well-accepted compositions for imaging, identifying, and/or quantifying DNA for the methods described herein. The oligonucleotide for a probe is at least approximately 8 nucleotides in length. In some embodiments, the oligonucleotide for a probe is between approximately 8 nucleotides and approximately 30 nucleotides long. In other embodiments, the oligonucleotide for a probe is between approximately 15 nucleotides and approximately 30 nucleotides long. The sequence of the oligonucleotide is contained within an amplicon and are contiguous nucleotides within the amplicon. When performing multiplex or LayerPlex qPCR assays, one tends to not use intercalating dyes because the intercalating dyes typically do not distinguish between different amplicons. Instead one typically uses probes containing different fluorescent molecules so that one can distinguish which organism's DNA is being amplified because of the distinct fluorescent emissions for each probe. FIGS. 1A-1D provides the DNA sequence of various probes and the fluorescent molecule and quencher molecule used with each probes. One of ordinary skill in the art can easily use other fluorescent molecules and quencher molecules with the probes and can identify of sequences for the probes so that probe can still be incorporated into an amplicon.

Figure 3:
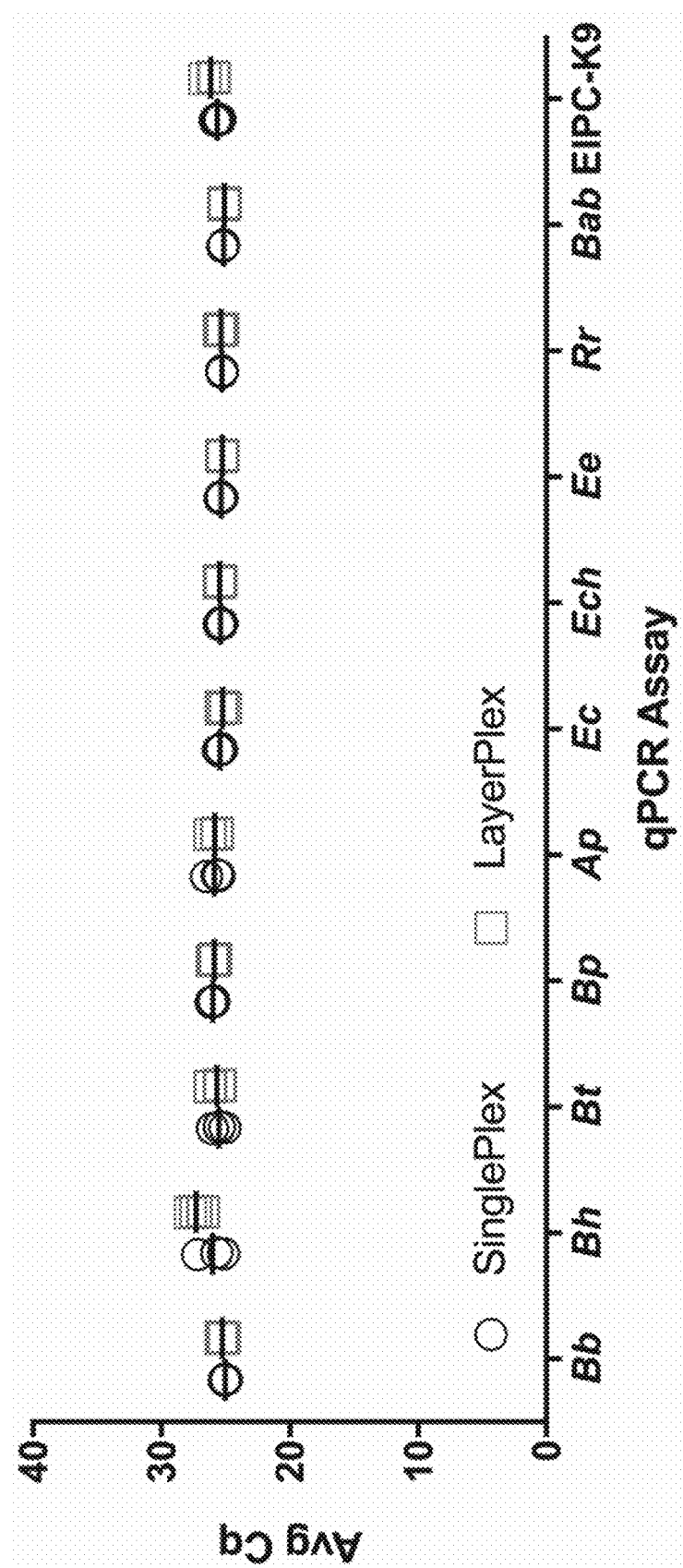
FIG. 3 is a comparison analysis of SinglePlex real-time PCR (qPCR) assays quantification cycle (Cq) values against combined LayerPlex qPCR assay Cq values. Pathogens assayed are as follows: *Borrelia burgdorferi* (Bb), *B. hermsii* (Bh), *B. turicatae* (Bt), *B. parkeri* (Bp), *Anaplasma phagocytophilum* (Ap), *Ehrlichia canis* (Ec), *E. chaffeensis* (Ech), *E. ewingii* (Ee), *Rickettsia rickettsii* (Rr), *Babesia* species (Bab), and endogenous internal positive control (NIPcK9). The primers and probes for these pathogens and NIPcK9 are provided in FIGS. 1A-1C but do not include the primers and probes listed "Additional Species Specific Assays" for *Borrelia hermsii, Babesia canis vogeli, B. gibsoni,* and *B. conradae.*

The LayerPlex qPCR assay described herein is a robust assay because it is highly sensitive, highly specific, highly efficient, and lacks inhibition. With a robust qPCR assay, the slope of the standard curve, its linearity (represented by the correlation coefficient, $R^2$) and Y-intercept contain valuable quality control information. High-quality qPCR assays are linear across the entire dilution series (e.g., $R^2$ close to 1), and the genomic DNA concentrations of the samples to be tested should fall within this linear range. The Y-intercept should be similar for all copy number variant assays (e.g., typically within a two cycle interval). See, D'haene, et al., Methods 50:262-270 (2010). The data presented below demonstrate that the LayerPlex qPCR assay has efficiencies between 90%-110%, $R^2$ values >0.9, high specificity, and high sensitivity. See, also, FIG. 3.

The gel-based PCR assay described herein is also highly sensitive and highly specific, however, it takes more time to perform than the LayerPlex qPCR assay and does not detect as many microorganisms as the LayerPlex qPCR assay.

The term "nucleic acid" as used herein, refers to a polymer of ribonucleotides or deoxyribonucleotides. Typically, "nucleic acid" polymers occur in either single- or double-stranded form, but are also known to form structures comprising three or more strands. The term "nucleic acid" includes naturally occurring nucleic acid polymers as well as nucleic acids comprising known nucleotide analogs or modified backbone residues or linkages, which are synthetic, naturally occurring, and non-naturally occurring, which have similar binding properties as the reference nucleic acid, and which are metabolized in a manner similar to the reference nucleotides. Exemplary analogs include, without limitation, phosphorothioates, phosphoramidates, methyl phosphonates, chiral-methyl phosphonates, 2-O-methyl ribonucleotides, peptide-nucleic acids (PNAs). A "nucleotide" encompasses a single nucleotide or a base pair of nucleotides. "DNA", "RNA", "polynucleotides", "polynucleotide sequence", "oligonucleotide", "nucleotide", "nucleic acid", "nucleic acid molecule", "nucleic acid sequence", "nucleic acid fragment", and "isolated nucleic acid fragment" can be used interchangeably herein. For nucleic acids, sizes are given in either kilobases (kb) or base pairs (bp), or nucleotides (nt). Estimates are typically derived from agarose or acrylamide gel electrophoresis, from sequenced nucleic acids, or from published DNA sequences.

A "primer" is a single stranded polynucleotide, which can be DNA or RNA, and which serves as a starting point for polynucleotide synthesis, for example, in a PCR. A "primer set" is at least one forward primer and at least one reverse primer capable of generating at least one amplicon in a PCR assay. In some embodiments of this invention, a primer set includes two forward primers and one reverse primer, or, alternatively, two reverse primers and one forward primer, which are capable of generating two amplicons that have overlapping sequences in common.

The polynucleotides of the invention, for example, primers and probes described herein, can be conjugated to a detectable label. A label is a composition detectable by spectroscopic, photochemical, biochemical, immunochemical, chemical, or other means. Non-limiting examples of detectable labels include chemiluminescent labels, fluorescent labels, radiolabels ($^{32}$P or other isotopes), electron-dense reagents, magnetic labels, enzymes (e.g., as those commonly used in an ELISA), haptens, other unique oligonucleotide sequences, and proteins for which antisera or monoclonal antibodies are available. Additional examples of labels suitable for the use in the claimed invention are well known to a person of ordinary skill in the art and such embodiments are within the purview of the invention.

A "target sequence" as used herein refers to a specific sequence within the genome (nucleic or cellular) of an organism being detected. In some embodiments, a target sequence is unique to the organism and therefore, a target sequence can be used to distinguish the organism being detected from the other organisms. Therefore, the method of analyzing a DNA sample to detect two or more organisms depends on identifying two or more specific sequences that are unique to the organisms being detected. In some embodiments, a target sequence is shared within a group of organisms but different from organisms outside of that group and can be used to distinguish the group of organisms from other groups of organisms. Therefore, the method of analyzing a DNA sample to the presence of organisms from two or more different groups depends on identifying two or more specific sequences that are unique to the organisms within each group being detected.

Prior to conducting the LayerPlex qPCR assay or the gel-based PCR assay, one needs to isolate DNA from the sample. Any known method of isolating and purifying DNA from a tissue and/or bodily fluid sample obtained from an animal (mammal or tick) can be used. Methods of isolating and purifying DNA from a tick sample and a mammalian sample are provided in the examples below. In addition, Schroeder, et al., *J. Vet. Diag. Invest.* 25:709-719 (2013) describes an automated DNA extraction protocol for isolating and purifying DNA from mammalian samples.

In a particular embodiment, the step of analyzing the DNA in the methods of the invention involve conducting the LayerPlex qPCR or a multiplex PCR assay (for use with a gel) designed to amplify the target sequences from the organisms being detected. A multiplex PCR assay or LayerPlex qPCR assay involves amplifying of one, two or more target sequences using PCR primer pairs designed to amplify the one, two or more target sequences from the genomes of the organisms being detected. In one embodiment, the portion of the target sequences amplified by the primer pairs specific for the target sequences are different sizes. The amplified sequences are referred to as "amplicons". As such, the amplicons can be distinguished from each other, for example, based on their sizes as determined by different techniques, for example, agarose gel electrophoresis. The presence of an amplified DNA of a specific size indicates the presence of the organism containing the corresponding target sequence in its genome. In another embodiment, the two or more amplicons can be the size. In this embodiment, one may need to use a different mechanism for distinguishing the amplicons of the same size from each other. But one of ordinary skill in the art can use the methods described herein to help distinguish the amplicons of the same size, if that is required to differentially diagnosis the microorganism present in the sample. Many different types of equipment for performing the PCR assays are known to one of ordinary skill in the art.

In another embodiment, the amplicons produced by PCR can be sequenced to confirm the presence of the target sequences from the microorganism(s) being detected. In some embodiments, the amplicons can range in size from approximately 15 bp to several hundred base pairs. As seen in FIGS. 1A-1D, the amplicons for the LayerPlex qPCR assay can range from 73 bp to 159 bp. Further, one uses the primers described in FIGS. 1A-1D to generate the indicated amplicons and the probes also described in FIGS. 1A-1D to identify the presence/absence of the amplicons in the LayerPlex qPCR assay. As discussed below, the amplicons for the gel-based PCR assay can range from approximately 230 bp to approximately 650 bp using the primers described below in Table 1. In another embodiment, one can use the appropriate primer sets to generate the indicated amplicons in FIGS. 1A-1C (which are smaller than the amplicons in Table 1 below). One can use any dye or other type of marker that is effective for identifying DNA on an agarose gel, polyacrylamide gel, or other types of gels.

In another embodiment, the step of analyzing the DNA using the methods of the invention include conducting DNA hybridization with at least one probe that hybridizes with at least one amplicon from the organisms being detected. Therefore, a probe specific for an organism hybridizes to the amplicon (and are complementary to a portion of the amplicon's sequence), if the specific organism's DNA is present in the sample, and an amplicon is produced. If the organism's DNA is not present in the sample, then no amplicon is produced, and the probe does not bind to the amplicon(s) that are produced by the PCR assay for the other microorganisms that are being detected.

A person of ordinary skill in the art can design various probes for specific binding to the target sequences in each of the organisms being detected and such embodiments are within the purview of the invention. For example, in one embodiment, FIGS. 1A-1D lists probes and their sequences for the indicated microorganisms that are useful in this invention.

The methods for detecting the binding between a probe and a target sequence are well known in the art and such methods are within the purview of the invention. For example, the probes that hybridize to the sequences in the genomes of the organisms being detected can be conjugated to a detectable label. The detectable label can be a fluorescent label, radioactive label, enzyme label, chemiluminescent label or magnetic label. Additional examples of detectable labels are known to a person of ordinary skill in the art and such embodiments are within the purview of the invention.

In one embodiment, different labels conjugated to different probes designed to bind to target sequences in different organisms to be detected are distinguishable from each other. For example, different labels can be of different types, i.e., a first label can be a radioactive label, a second label can be an enzyme label, and a third label can be a fluorescent label. Alternately, different probes can be of the same type; however, distinguishable from each other. For example, three labels can be fluorescent labels emitting fluorescence of different frequencies. A skilled artisan can design different probes that enable distinguishing the different probes from each other and such embodiments are within the purview of the invention.

In a further embodiment, the step of analyzing the DNA in the methods of the invention can include conducting a molecular beacon assay using two or more molecular beacons that each hybridizes to target sequences from the organisms being detected. A molecular beacon is a polynucleotide that hybridizes to a target sequence. Typically, a molecular beacon is a hairpin shaped polynucleotide with an internally quenched fluorophore whose fluorescence is restored when the beacon hybridizes to a target sequence. Certain aspects of molecular beacon assay are described in Marras, et al., *Clnica Chimica Acta* 363:48-60 (2006), which is incorporated herein by reference in its entirety. The beacons specific for the organisms being detected are designed to hybridize to a target sequences within the genomes of the organisms. Therefore, a beacon specific for an organism hybridizes to the genomic DNA isolated from the sample only when the specific organism is present in the sample, and the beacon does not bind to the genomic DNA isolated from the sample when a different or related organism is present in the sample. When a beacon hybridizes to a target sequence, the fluorophore and the quencher are separated from each other resulting in fluorescence. As such, fluorescence corresponding to a fluorophore attached to a beacon indicates the presence of the corresponding target sequence and the presence of the corresponding organism in the sample. The methods of detecting the fluorescence from a beacon are well known in the art and such methods are within the purview of the invention. In one embodiment, different fluorophores are conjugated to different beacons designed to bind to sequences from different organisms being detected. For example, three fluorophores can emit fluorescence of different frequencies. A skilled artisan can design different beacons that enable distinguishing different beacons from each other and such embodiments are within the purview of the invention.

In a particular embodiment, the step of analyzing the DNA in the methods of the invention involve conducting a multiplex PCR assay designed to identify target sequences from the organisms suspected of being present in a sample. A multiplex PCR assay involves amplifying one, two, or more target sequences using PCR primer pairs designed to bind to specific sequences within the DNA that could be present in the sample to generate one, two, or more amplicons, and detecting one, two, or more labels bound to the one, two or more amplicons generated which allows one to determine which microorganism's DNA is present in a sample. As such, designing a multiplex qPCR involves designing primers specific for amplification of target sequences from the organisms being detected as well as designing molecular beacons, probes or primers that detect the amplified amplicons.

In a further embodiment, the step of analyzing the DNA in the methods of the invention include conducting a multiplex or single nucleotide primer extension assay based on different nucleotides added to the primers designed to hybridize to target sequences from the organisms being detected.

For both the gel-based multiplex PCR assay and the LayerPlex qPCR assay, the concentrations of the primers and probes, the temperatures of the assay and the amount of time spent at the various temperatures, the concentration of the various components of the PCR master mix, and the method of isolating DNA from a sample, can be important to successful detection of microorganisms' DNA in the sample. The concentration of each primer for the gel-based multiplex PCR can range from approximately 0.04 µM to approximately 4 µM, or from approximately 0.1 µM to approximately 1 µM, approximately 0.4 µM, approximately 0.3 µM, or a combination thereof. The concentration of DNA isolated from a sample for the gel-based multiplex PCR can range from approximately 0.00012 pg/µl to approximately 1.2 pg/µl, from approximately 0.0012 pg/µl to approximately 0.12 pg/µl, or approximately 0.012 pg/µl.

For the LayerPlex qPCR assay and the gel-based multiplex PCR assay, in one embodiment, the temperatures and times for denaturation, annealing, and extension of the PCR assay can range as follows: for denaturation, approximately 85° C. to approximately 98° C., for approximately 10 seconds to approximately 10 minutes; for annealing, approximately 50° C. to approximately 80° C. for approximately 10 seconds to approximately 10 minutes; for extensions, from approximately 60° C. to approximately 80° C. for approximately 10 seconds to approximately 10 minutes. The number of PCR cycles can range from approximately 10 to approximately 50. In another embodiment, the temperatures and times for denaturation, annealing, and extension cycles of the PCR assay are as follows: approximately 85.0° C. to approximately 98.0° C. for approximately 10 seconds to approximately 30 minutes) (Stage 1); approximately 85.0° C. to approximately 98.0° C. for approximately 1 second to approximately 10 minutes followed by approximately 40.0° C. to approximately 80.0° C. for approximately 1 second to approximately 10 minutes with approximately 30 to approximately 50 repetitions (Stage 2). Data are collected at the last step of Stage 2. In another embodiment, the temperatures and times for denaturation, annealing, and extension cycles of the PCR assay are as follows: approximately 90.0° C. to approximately 96.0° C. for approximately 1 minute to approximately 20 minutes (Stage 1); approximately 90.0° C. to approximately 96.0° C. for approximately 1 second to approximately 5 minutes followed by approximately 50.0° C. to approximately 70.0° C. for approximately 1 second to approximately 1 minute with approximately 35 to approximately 45 repetitions (Stage 2).

The concentration of each microorganism's primers for the LayerPlex qPCR assay can range from approximately 0.05 µM to approximately 500 µM, or from approximately 0.5 µM to approximately 50 µM, approximately 5 µM or approximately 5.6 µM. The concentration of each microorganism's probe for the LayerPlex qPCR assay can range from approximately 0.01 µM to approximately 100 µM, or from approximately 0.1 µM to approximately 10 µM, approximately 1 µM or approximately 1.6 µM. The concentration of DNA isolated from a sample for the LayerPlex qPCR can range from approximately 9.49E−10 ng/µl to approximately 7.59E±5 ng/µl. The temperatures and times denaturation, annealing, and extension parts of the PCR assay for the LayerPlex qPCR assay can range as follows: for denaturation, approximately 85° C. to approximately 98° C., for approximately 10 seconds to approximately 30 minutes; for annealing, approximately 85° C. to approximately 98° C. for approximately 0.1 seconds to approximately 10 minutes; for extensions, from approximately 50° C. to approximately 80° C. for approximately 0.1 seconds to approximately 10 minutes. The number of PCR cycles can range from approximately 20 to approximately 60.

For both the gel-based multiplex PCR assay and the LayerPlex qPCR assay, in an optional embodiment, one could have at least one portion of the PCR assay to include primers (and a probe for the LayerPlex qPCR assay) that is specific for the animal from which the sample was obtained. Further, if the sample is a tick (or its bodily fluids and/or tissue), one may want another portion of the PCR assay to include primers (and a probe for the LayerPlex qPCR assay) that is specific for the mammal from which the tick was obtained (if the tick was obtained while feeding on an animal). The goal would be to confirm that the sample was obtained from that type of animal. In the examples below and in FIG. 1C, a primer set and a probe specific for a dog is described (see NIPcK9 primers and probe). One of ordinary skill in the art can generate a primer set and a probe (if applicable) specific for a feline, bovine, ovine, equine, cervid, etc., using mitochondrial or nucleic DNA from that animal.

Following are examples which illustrate procedures for practicing the invention. These examples should not be construed as limiting. All percentages are by weight and all solvent mixture proportions are by volume unless otherwise noted.

Example 1—Assaying Specimens for Presence of *Ehrlichia canis* (Ec), *Ehrlichia chaffeensis* (Ech), *Anaplasma phagocytophilum* (Ap), and *Borrelia burgdorferi* (Bb)

A total of 1,182 specimens (namely, 650 ticks, 525 wildlife tissues, and 7 dog blood samples) were analyzed in this study. All sample submissions were voluntary. Upon arrival, ticks were identified using dichotomous key (e.g., Keirans and Litwak, *J. Medical Entomology* 26(5):435-448 (1989); and Strickland and Diamant, *Ticks of Veterinary Importance*, Washington: Animal and Plant Health Inspection Service, U.S. Dept. of Agriculture (1976)). The identified ticks were placed in a 70% ethanol solution and submitted for DNA extraction. When tick morphology was not enough to determine the species, 12S rRNA PCR and sequencing of the PCR product was used to determine the species (Williamson, et al., *Emerg. Infect. Dis.* 16(3):441-446 (2010)).

DNA was extracted from whole ticks using the High Pure PCR Template Preparation Kit (Roche, Indianapolis, IN) following manufacturers recommendations with modifications to adapt the protocol to ticks. Ticks were placed in screw cap microfuge tubes containing 1.4 mm ceramic beads for flat ticks, or 2.8 mm ceramic beads for engorged ticks. 200 µl phosphate-buffered saline (PBS), 200 µl of tissue lysis buffer, and 40 µl of Proteinase K were added to the tube; the tubes were then placed in a bead mill BeadRuptor 24 (Omni International, Inc., Kennesaw GA) and homogenized for 5 minutes at a 5.65 m/s intensity (equivalent to 210 g). The supernatant was separated into a clean microfuge tube, and 200 µl of binding buffer was added to each sample. This mixture was incubated for 10 minutes at 70° C. After incubation, 100 µl of isopropanol was mixed into the solution. This solution was then transferred to a high pure filter tube and collection tube assembly. This assembly was then centrifuged for 1 minute at 8,000 g. After centrifugation the collection tube and flow-through were discarded, and a new collection tube was assembled with the same pure filter tube. 500 µl of wash buffer was added to the reservoir of the pure filter tube, and the assembly was centrifuged for 1 minute at 8,000 g. The washing procedure was then repeated. After the second washing, the assembly was centrifuged at full speed for 10 seconds to remove any residual ethanol, and the collection tube was then discarded. The high pure filter tube was then assembled with a clean microfuge tube, and 100 µl of pre-warmed elution buffer (70° C.) was added to the high pure filter tube. This assembly was centrifuged for 1 minute at 8,000 g. Following elution, the extracted DNA was analyzed using a Nanodrop (ThermoFisher Scientific, Waltham, MA) for quantity and quality. The extracted DNA was then stored at −20° C. until further analysis.

DNA was extracted from blood samples using the High Pure PCR Template Preparation Kit (Roche, Indianapolis, IN) following manufacturers recommendations. As described above, the extracted DNA was analyzed using a Nanodrop (ThermoFisher Scientific, Waltham, MA) for quantity and quality. The extracted DNA was then stored at −20° C. until ready for further analysis.

Multiplex PCR for pathogen detection: The amplification controls for Ec, Ech, Ap, and Bb utilized in this study were synthetically generated. The genomes for these organisms are available at GenBank® (NCBI). The primers used in the multiplex reaction are provided in Table 1 below and generated an amplicon having the indicated SEQ ID NOs. and size.

TABLE 1

| Bacteria (gene) | Forward primer (SEQ ID NO) | Reverse primer (SEQ ID NO) | Amplicon (size) |
| --- | --- | --- | --- |
| Bb (fla B) | AACACACCAGCATCACTTTC AGG (SEQ ID NO: 69) | GAGAATTAACTCCGCCTTG AGAAGG (SEQ ID NO: 70) | SEQ ID NO: 79 (235 bp) |
| Ec (16S rRNA) | CAATTATTTATAGCCTCTGG CTATAGGAA (SEQ ID NO: 71) | TATAGGTACCGTCATTATCT TCCCTAT (SEQ ID NO: 72) | SEQ ID NO: 80 (389 bp) |
| Ech 16S rRNA) | CAATTGCTTATAACCTTTTG GTTATAAAT (SEQ ID NO: 73) | TATAGGTACCGTCATTATCT TCCCTAT (SEQ ID NO: 74) | SEQ ID NO: 81 (390 bp) |

TABLE 1-continued

| Bacteria (gene) | Forward primer (SEQ ID NO) | Reverse primer (SEQ ID NO) | Amplicon (size) |
|---|---|---|---|
| Ap (msp2) | CCGCTTTAGTGGCACATTATAG (SEQ ID NO: 75) | CCGAAATTCTAAAATCTGGGT (SEQ ID NO: 76) | SEQ ID NO: 82 (644 bp) |

These amplicons were synthesized (Integrated DNA Technologies, Inc.) and cloned in a vector that was later transformed into E. coli TOP10 cells. After transformation, plasmid DNA was extracted from this culture and used as the amplification control for the PCR tests. Plasmid DNA was extracted by using the PureYield™ Plasmid Midiprep System (Promega Corp., Madison WI) following manufacturer's recommendations. Briefly, 250 ml overnight cultures of E. co/i TOP10 cells containing the amplification control vectors were harvested by centrifugation at 5,000 g for 10 minutes. Cells were lysed and placed in a column assembly to extract and purify DNA. DNA was eluted in 600 µl of nuclease free water.

All samples were tested for Bb, Ec, Ech and Ap in a multiplex PCR platform. The PCR reaction composition and the amplification conditions are provided in Tables 2 and 3 below.

Carolina) as follows. First, the 5'- and 3'-ends were removed from each sequence to avoid utilization of unclean and noisy sections obtained during sequencing. After cleaning the ends, each peak in the chromatograms was checked for accuracy of the corresponding nucleotide to make sure listed nucleotides were correct. Once all sequencing results were cleaned, the forward and reverse sequences were assembled using MacVector Assembler 13.0.7 (MacVector Inc., North Carolina). The consensus sequence produced was then used for further alignment analyses and Neighbor-Joint phylogenetic tree assembly.

Example 2—Construction of Amplification Control Plasmids

The amplification control plasmid for multiplex PCR assays were cloned individually utilizing the cloning vector

TABLE 2

PCR composition

| | 25 µl reaction | Final Concentration |
|---|---|---|
| 10× Standard Taq Reaction Buffer | 2.5 µl | 1 unit |
| Taq DNA Polymerase (AccuStart) | 0.1 µl | 200 µM |
| Forward Primer fla B (SEQ ID NO: 69) (Bb) | 0.5 µl | 0.4 µM |
| Reverse Primer fla B (SEQ ID NO: 70) (Bb) | 0.5 µl | 0.4 µM |
| Forward Primer msp2 (SEQ ID NO: 75) (Ap) | 0.5 µl | 0.4 µM |
| Reverse Primer msp2 (SEQ ID NO: 76) (Ap) | 0.5 µl | 0.4 µM |
| Forward Primer 16S rRNA (SEQ ID NOs: 71 & 73) (Ec & Ech) | 0.5 µl | 0.3 µM |
| Reverse Primer 16S rRNA (SEQ ID NOs: 72 & 74) (Ec & Ech) | 0.5 µl | 0.3 µM |
| DNA | 2 µl | 0.012 pg/µl |
| Nuclease-free water | To 25 µl | |

TABLE 3

Thermocycler conditions for multiplex PCR

| STEP | | TEMP | TIME |
|---|---|---|---|
| Initial Denaturation | | 94° C. | 3 min |
| Denaturation | 30 cycles | 94° C. | 1 min |
| Annealing | | 63° C. | 1 min |
| Extension | | 72° C. | 1 min |
| Final extension | | 72° C. | 1 min |
| Hold | | 4° C. | |

After the PCR reaction, 5 µL of the product was mixed with Orange G loading buffer and placed into wells of a 1% agarose gel containing 0.4 pg/ml of ethidium bromide (Bio-Rad Laboratories Inc., Hercules, CA). The gel was run at 90 volts for 40-60 minutes. After electrophoresis the gels were imaged using ChemiDoc™ Touch Imaging System (Bio-Rad Laboratories, Inc., Hercules, CA). Any positive bands were then cut from the gel and purified using the Wizard® SV Gel and PCR Clean-up System (Promega Corp., Madison WI) per the manufacturer's recommendations. Clean PCR amplicons were then sent to Eton Biosciences Ltd. (San Diego, CA) for sequencing to confirm the PCR result.

Sequences were cleaned individually before assembly using MacVector Version 13.0.7 (MacVector Inc., North pCR2.1 TOPO system (ThermoFischerScientific, Waltham, MA) using the primers disclosed in Table 1. PCR amplicons corresponding to each amplification control were ligated into pCR2.1 TOPO plasmid vector following manufacturer's recommendations using conditions provided in Table 4.

TABLE 4

Ligation reaction used for TOPO-TA cloning

| Reagent | Vol |
|---|---|
| Fresh PCR product | 4 µl |
| Salt Solution | 1 µl |
| TOPO ™ Vector | 1 µl |
| Final Volume | 6 µl |

For Ap, a synthetic fragment of the gene msp2 (locus APH_1017, gene location: 1076720-1075449 A. phagocytophilum HZ) cloned into the plasmid pIDTSMARTkan (Integrated DNA Technologies, Inc.) was ordered. msp2 was subcloned with EcoRV flanking cut sites into the cloning vector pCR2.1, TOPO system (ThermoFischerScientific, Waltham, MA).

Vectors containing the fragments of interest were chemically transformed into E. coli Top10 cells following manufacturer's recommendations. Transformed cells were plated on LB plates containing 100 g/ml ampicillin (Amp100) and 50 g/ml kanamycin (Kan50) at 37° C. overnight. Individual colonies were selected and grown overnight in 7 ml LB media supplemented with Amp100 and Kan50 at 37° C. and 200 rpm. Plasmid constructs were isolated using the Promega PureYield™ Midi System kit following manufacturer's recommendations with little modification. 600 μl of overnight bacterial cultures were transferred to 1.5 ml microfuge tube. Cells were lysed by adding 100 μl of cell lysis buffer, and mixed by inverting the tube 6 times. Then 350 μl of cold (4-8° C.) neutralization solution was added and mixed thoroughly by inverting the tube 9 times to ensure complete neutralization. The tubes were centrifuged at 20,000 g for 3 minutes. Supernatants were transferred to a PureYield™ minicolumn after placing into a PureYield™ collection tube, and centrifuged at 20,000 g for 30 seconds. The flow through was discarded, and 200 μl of endotoxin removal wash buffer was added to the column followed by centrifugation at 20,000 g for 30 seconds. Finally, 400 μl of column wash solution was added to the column and centrifuged at maximum speed for 30 seconds; the columns were transferred to clean 1.5 ml microfuge tubes, and 25 μl of elution buffer was added to the column matrix and incubated for 3 minute at room temperature before eluting the clean plasmid DNA by centrifugation at 20,000 g for 1 minute.

Constructs were confirmed by PCR using primers specific for the fragments cloned as well as by restriction enzyme (RE) digestion using specific RE depending on the construct. EcoRI was used to check for the flaB gene fragment, NotI was used to check for either Ec or Ech 16S rRNA gene fragments, and EcoRV was used to check the insertion of the Ap msp2 gene fragment.

Constructs were also submitted for sequencing (Eton Biosciences, San Diego, CA), and sequences were analyzed through BLAST using MacVector 12.6 software (MacVector Inc., Cary, NC). Once initial constructs were confirmed, individual clones for each construct were grown in 250 ml of LB complemented with Amp100 and Kan50 overnight at 37° C. under shaking conditions (200 rpm).

Plasmid DNA was purified using Promega PureYield™ Plasmid Midiprep kit following manufacturer's recommendations with modification. Overnight cultures were pelleted by centrifugation at 5,000 g for 10 minutes, and supernatants were discarded. The cell pellets were resuspended in 3 ml cell resuspension solution followed by the addition of 3 ml of cell lysis solution and mixed by gently inverting the tube 3-5 times. Tubes were incubated for 3 minutes at room temperature followed by the addition of 5 ml neutralization solution, and the lysates were centrifuged at room temperature and 5,000 g for 15 minutes to eliminate cellular debris. Remaining debris was removed using the PureYield™ clearing; followed by the DNA elution step. Both the steps were performed following manufacturer's recommendations with additional incubation of the elution mix for 5 minutes at room temperature before eluting by centrifugation. Plasmid DNA concentration and quality were measured using a NanoDrop (ThermoFisher Scientific, Waltham, MA) prior to the following cloning steps.

To construct the different multiplex amplification controls containing three genetic markers, 20 g of plasmid DNA from each of the clones (those containing Bb, Ec, Ech and Ap markers) were digested with the corresponding restriction enzyme and subcloned into the final pCR2.1 plasmid to generate two combinations of amplification controls (Bc-Ap or Bch-Ap). To sub-clone all amplification controls in one plasmid, one sub-cloning at a time was performed. Ec marker was cloned into pCR2.1 containing Bb flaB amplicon. The same approach was taken for Ech amplification control.

Ap marker was then cloned. Briefly, the vector containing the Bb flaB fragment was digested with NotI to clone the 16S rRNA from Ec or Ech. EcoRV was used to clone the Ap msp2 fragment in between the Bb flaB and the Ec or Ech 16S rRNA genes. All digestion fragments were confirmed by running DNA electrophoresis using 1.5% agarose gels at 80 volts for 45 min.

DNA purification for agarose gels was done using PCR and Gel Clean Up™ kit (Promega Inc.). DNA concentration and purity was measured using NanoDrop (ThermoFisher Scientific, Waltham, MA). In this process digested plasmids were dephosphorylated following manufacturer's recommendations (Table 5, Antarctic Phosphatase, NEB) at 37° C. for 30 minutes. This dephosphorylation was done to prevent sticky ends from re-ligating during the following steps, and to optimize the cloning process. Following dephosphorylation of the digested plasmids, the corresponding inserts were added, and the ligation reaction using T4 DNA ligase (NEB Inc.) was performed as indicated in Table 6.

TABLE 5

Plasmid Dephosphorylation Protocol (NEB Inc.)

| Reagent | Volume |
| --- | --- |
| Plasmid | 50 μl |
| 10x Antarctic Phosphatase buffer | 1 μl |
| Dd water | 6 μl |
| Antarctic Phosphatase | 3 μl |

TABLE 6

Ligation Protocol with T4 DNA Ligase (NEB Inc.)

| Reagent | Volume |
| --- | --- |
| Insert | 10 μl |
| Vector | 3 μl |
| T4 DNA ligase | 1 μl |
| 10x buffer | 2 μl |
| Dd water | 4 μl |

Incubated at 14-16° C. overnight

Ligation reactions were precipitated prior to their transformation into *E. coli* Top10 electro-competent cells. To this end, each ligation reaction was incubated at −20° C. for a minimum of 2 hours with 0.5 volume of 7.5 M ammonium hydroxide and 2.5 volume 95% ethanol. After incubation, constructs were centrifuged at 20,000 g for 15 minutes and pellets were cleaned with 75% ethanol. All constructs were re-suspended in water and electroporated into E. co/i Top10 cells utilizing the following conditions: 2 μl of ligation reaction was added to the volume of cells recommended by the manufacturer. For each ligation reaction, the following protocol was used.

The ligation and the cells were mixed gently with the pipette tip, and the mix was transferred to an ice-cold electroporation cuvette. For electroporation, Eppendorf electroporator was set at 25 μF capacitator, 2.5 kV and 200 Q. To recuperate the cells after the pulse, 250 μl room temperature S.O.C. medium was added to the cells and incubated at 37° C. for 1 hour under shaking conditions (200 rpm). After the preliminary incubation without antibiotics, the transformation was spread on a pre-warmed LB plate containing Amp100 and Kan50 and incubated overnight at 37° C. for colony confirmation.

After overnight growth, single colonies were selected and grown overnight in LB broth complemented with Amp100 and Kan50 and incubated at 37° C. overnight under shaking conditions (200 rpm) to identify amplification clones from each cloning step. Cells from the cultures were pelleted at described above, and plasmid DNA purified using PureYield® Plasmid Miniprep kit (Promega, Inc.) following the manufacturer's recommendations and modifications described above. Plasmid DNA samples were evaluated for DNA concentration and quality using a NanoDrop (ThermoFisher Scientific, Waltham, MA). Constructs were confirmed by PCR using specific primers for each marker. Amplification products were separated in 1.5% agarose electrophoresis and sequenced for confirmation (Eton Biosciences, San Diego, CA). Sequences were analyzed through BLAST using MacVector 12.6 software (MacVector Inc., Cary, NC).

Example 3—DNA Extraction

DNA was extracted from the tick samples using Wizard™ SV Genomic DNA Purification kit (Promega Corp., Madison, WI) following manufacturer's recommendations with modifications. For optimal DNA extraction, adult individual ticks were homogenized utilizing the bead mill Bead Ruptor 24 (Omni International, Inc., Kennesaw, GA) in 200 µl of Nuclei Lysis Solution, plus 50 µl of 0.5 M EDTA, 40 µl of a 20 mg/ml Proteinase K solution, and 5 µl RNase A solution. The mixture was incubated at 70° C. for 10 minutes. After the initial incubation, un-engorged ticks were homogenized with 1.4 mm ceramic beads while 2.8 mm ceramic beads were used with engorged ticks. After homogenization, tubes were centrifuged at 10,000 g to eliminate tick debris. Supernatants were collected, and 250 µl of Wizard™ SV Lysis Buffer was added to each sample and the mixture. The mixture was run through filter columns at 13,000 g for 3 minutes. DNA bound to the filter was washed and eluted following manufacturer's recommendations. To extract DNA from the tick immature stages (nymphs and larvae), pools of a maximum of 15 nymphs or 50 larvae were made. Specimens received a code indicating the type of pool generated.

All immature specimens were stored at −80° C. with 100 µl TE buffer for at least one hour. Specimens were homogenized utilizing pestles while the samples were frozen, followed by DNA extraction procedures using the prepGEM™ DNA Extraction Insect following manufacturer's recommendations by adding to the tick sample 35 µl of PCR-grade water, 4 µl of 10× buffer BLACK and 1 µl prepGEM™. The mixture was incubated at 75° C. for 15 minutes, and then at 95° C. for 15 minutes. The extracted DNA concentration and purity were measured using a NanoDrop (ThermoFisher Scientific, Waltham, MA). The extracted DNA was stored at −20° C. until use. Tissue and blood samples were processed following manufacturer's recommendations with no modifications.

Example 4—Multiplex PCR

The PCR was done in 25 µl volume, using AccuStart™ SuperMix (Quanta Bioscience Inc., Gaithersburg, MD). Table 2, supra, shows the composition and concentration of the reagents utilized in such reaction. A master mix was prepared in a PCR clean bench to avoid contamination. After the reaction tubes were prepared, PCR was performed in an Eppendorf AG Master Cycler following the cycling condition described in Table 3, supra. The amplification products were separated on a 1.5% agarose gel (Bio-Rad Laboratories Inc., Hercules, CA) at 90 volts for 40-60 minutes and imaged using the ChemiDoc touch Imaging System (Bio-Rad Laboratories Inc., Hercules, CA). Positive bands were excised from the gel and purified using the Wizard™ SV Gel and PCR clean up system (Promega Corp., Madison, WI) following manufacturer's recommendations. The purified products were sent for sequencing (Eton Biosciences, San Diego, CA). Sequences were analyzed through BLAST using MacVector 12.6 software (MacVector Inc., Cary, NC).

Example 5—Gel-Based Multiplex & qPCR Assays to Identify Tick-Borne Pathogens

211 *Rhipicephalus sanguineus* (brown dog ticks) gathered from 160 domestic dogs and environmental locations from La Paz, Baja California, Mexico were utilized for this study. Ticks from each animal and location were grouped individually into tubes ranging from 1-20 ticks per tube, depending on the number found on/in the respective collection locations. Each tube was assessed for tick engorgement level, where at least one engorged tick was sampled from each tube if applicable. Ticks sampled from each tube depended on amount of ticks residing in respective tube (i.e. in the case of a tube containing at least five ticks, one engorged and one flat tick was sampled). In most cases only one engorged tick was sampled from each eligible tube under the assumption of pool feeding, where all surrounding ticks on the same animal are expected to maintain equal pathogen distribution through engorgement. Individual ticks selected from each tube were assessed for species identification (*R. sanguineus, n*=211), developmental stage (noted as adult/nymph), and sex.

Whole ticks utilized for this study were submitted for DNA extraction. Standardized procedures were followed for tick handling, and subsequent DNA extraction with the MagMAX™-96 Nucleic Acid (NA) Isolation Kit (ThermoFisher Scientific, Waltham, MA) following manufacturer's recommendations adopted from a previous publication (Schroeder, et al., *J Vet. Diag. Invest.* 25:709-719 (2013)), with modifications to adapt the protocol to ticks. Select ticks were placed in screw cap microfuge tubes containing 1.4 mm ceramic beads (Omni International, Inc., Kennesaw, GA). 400 µl of Phosphate-Buffered Saline (PBS) was added to each tube; the tubes were then placed in a bead mill BeadRuptor 24 (Omni International, Inc., Kennesaw, GA) and homogenized for 5 minutes at a 5.65 m/s intensity. 200 µl of homogenate suspension was then transferred to a 96-well deep-well plate containing 20 µl of magnetic bead mix (10 µl of lysis/binding enhancer and 10 µl of NA binding beads), 300 µl of lysis solution, 1 µl of carrier NA (1 µg/l), and 300 µl of isopropanol). This plate represents the sample plate. The following 96-well plates were loaded into an automated KingFisher™ Flex Magnetic Particle Processor (ThermoFisher Scientific, Waltham, MA) for nucleic acid purification: sample plate, wash solution 1 plate (300 µl/well), wash solution 2 plate (300 µl/well), and elution buffer plate (90 µl/well), reagents supplied with kit. The nucleic acid purification procedure consisted of the following steps: lysis/binding for 5 min, one 60-sec wash 1, one 15-sec wash 2, 1-min dry step, and a 3-min heated elution step at 95° C. All samples were immediately placed on ice following denaturation and prior to qPCR amplification. After amplification, the extracted DNA was then stored at −20° C. To minimize the potential risks for contamination, DNA extraction, (q)PCR amplification, and agarose gel electrophoresis were performed in physically separate rooms. Positive controls and negative controls (water) were included in qPCR multiplex assays.

Bacterial cell substrate DNA extraction provided genomic DNA controls. IFA bacterial substrate slides (VMRD, Pullman, WA) were utilized to represent pure genomic DNA of Bb, Rr and Ec. These inactivated bacterial slides were prepared through rehydration with 10 µl PBS onto a single slide well and then suspended in 90 µl PBS, followed by DNA extraction through automated KingFisher DNA extraction.

Molecular analysis PCR: The TaqMan qPCR (25 µl total volume) used for this study utilized the components of a commercial qPCR kit (following manufacturer's recommendations) and primers and probes designed for Bb, Ec, Rr and an endogenous canine amplification control. The qPCR was performed in an Applied Biosystems® 7500 Fast Real-Time PCR System (ThermoFisher Scientific, Waltham, MA). Amplification continued for 40 cycles, where samples with a quantification cycle (Cq)<36.0 cycles were considered positive.

For suspect verification, positive results from the qPCR multiplex assays were compared with those obtained by conventional PCR. A conventional PCR protocol for the detection of the 16S RNA gene of *Ehrlichia* spp. was utilized for the confirmation of Ec as previously described (Wen, et al., *J. Clin. Microbiol.* 35:1852-1855 (1997)). The respective PCR was standardized as a nested PCR reaction, utilizing primers common to *Ehrlichia* spp., followed by a nested PCR to detect the specific species of *Ehrlichia*. Another conventional PCR protocol for the detection of the ompA gene of *Rickettsia* spp. was utilized for the confirmation of *R. rickettsii* as previously described (Ishikura, et al., *Microbiol. Immunol.* 47:823-832 (2003)). The respective PCR was standardized as a nested PCR reaction, utilizing primers common to *Rickettsia* spp., followed by a nested PCR to detect the specific species of *Rickettsia*. Positive (genomic) controls and negative controls (water) were included in all PCR assays.

Sequencing: After completion of nested PCR reactions on the positive Ec suspects, 10 µl of the product was mixed with OrangeG loading buffer (NEB Inc., Ipswich, MA) and placed into wells of a 1.5% agarose gel containing 0.4 g/ml of GelRedrm (Biotium, Hayward, CA). Gel electrophoresis was performed at 90 volts for 60-90 minutes. After electrophoresis the gels were imaged using GelDoc™ Imaging System (Bio-Rad Laboratories, Inc., Hercules, CA). Positive bands were then cut directly from the gel and purified using the Wizard® SV Gel and PCR Clean-up System (Promega Corp., Madison WI) per the manufacturer's recommendations. Purified products were then sent to Eton Biosciences Ltd. (San Diego, CA) for sequencing to confirm the PCR results. Sequences were determined on both forward and reverse strands to obtain maximal data accuracy.

Contig sequences from each Ec suspects were assembled individually using CLC MainWorkBench 7.7 (CLCbio, Aarhus, Denmark) by utilizing the associated sequences assembly tool. Consensus sequences produced were then aligned to an in-house curated *Ehrlichia* spp. 16S rRNA gene sequence reference database containing *Ehrlichia* spp. type strains Oklahoma (*E. canis*), Welgevonden (*E. ruminantium*), Arkansas (*E. chaffeensis*), Stillwater (*E. ewingii*), and AS145 (*E. muris*), through the alignment creation tool based on standard parameters set by CLC MainWorkbench 7.7. Each end of the raw alignment was trimmed to remove positions containing gaps. Finally the reformatted sequences were re-sorted by similarity to achieve a completed data set. Trees were generated for the suspect sequence set against *Ehrlichia* spp. based on the Neighbor Joining tree construction method and the nucleotide distance measure Jukes-Cantor. In addition, bootstrap analysis was performed at 1000 replicates. Trees were then re-rooted against an outgroup species type strain (Ap strain Webster).

Example 6—Specificity of Gel-based Multiplex PCR Assay

The specificity of a gel-based multiplex PCR assay was tested with 1,182 specimens, particularly, 650 ticks, 525 wildlife tissues, and 7 dog blood samples. Target sequences were identified using between 25 ng and 100 ng total DNA from the sample. The test was 95.7% specific for Bb using ticks, and 83.3% when using tissues (Tables 7 and 8). Blood samples that tested positive (1/7) were confirmed positive by sequencing.

TABLE 7

PCR specificity by sample type

| Bacterial species | Ticks | Small mammals tissue | Blood samples |
|---|---|---|---|
| Bb | 95.7% | 83.3% | 100% |
| Ec | 85.18% | 87.09% | 100% |
| Ech | 47.82% | 100% | 0 |

TABLE 8

PCR specificity by sample type

| Bacterial species | No. positive sequencing/ No. positive PCR | Percent |
|---|---|---|
| Bb | 54/51 | 94.4 |
| Ec | 51/59 | 86.4 |
| Ech | 24/36 | 66.6 |

Ap infection was not detected in any of the samples tested. Nevertheless, the invention was tested with samples containing other *Anaplasma* spp. and was shown not to cross react. The detection of Ec was 85.18% specific when analyzing tick samples, and 87.09% specific when testing tissues. All positive blood samples were confirmed by sequencing (1/7). Ech showed 100% specificity when testing tissues and only 50% specificity when testing ticks.

The apparent low specificity of the test in tissues for Ec and Ech is mostly because these bacteria are intracellular pathogens that infect white blood cells, in particular monocytes. Ap infects granulocytes. These tests will allow physicians and veterinarians to differentiate whether Ec, Ech and/or Ap caused the infection. The current technologies do not permit such differentiation because conducting serological diagnosis involves significant cross-reaction between all Rickettsiales microorganisms (*Anaplasma, Ehrlichia* and *Rickettsia* species). Tick samples infected with both pathogens were also detected (Table 9).

TABLE 9

Ehrlichia and Borrelia co-infection

| Positive Samples (n) | Ec and Bb | Ech and Bb |
|---|---|---|
| Ticks Samples (45) | 18 | 9 |
| Small mammals tissues samples (5) | 0 | 0 |
| Blood samples (1) | 0 | 0 |

Example 7—LayerPlex Assay to Identify Tick-Borne Pathogens

This LayerPlex assay using qPCR to identify one or more tick-borne pathogens in a sample. The LayerPlex assay has the following three layers; (1) Borrelial Layer which identifies if any of the following are present: *B. burgdorferi*, *B. hermsii*, *B. turicatae*, and *B. parkeri*; (2) Rickettsiales Layer which identifies if any of the following are present: *R. rickettsii*, *E. canis*, *E. chaffeensis*, *E. ewingii*, and *A. phagocytophilum*; and (3) Babesial Layer which identifies if any of the following are present: *B. canis vogeli*, *B. gibsoni*, *B. canis canis*, *B. canis rossi*, *B. caballi*, *B. odocoilei*, *B. divergens*, and *B. bigemina*. Each layer in this assay utilize its own distinct fluorescent labels for determining the presence of one or more of the microbial organisms in that layer. Then to identify the specific pathogen present, one must conduct a second qPCR assay with different fluorescent labels to identify the particular microorganism. As mentioned above, one performs the LayerPlex qPCR assay on a sample to determine if any pathogens are identified by the three layers (Borrelial, Rickettsiales, and Babesial) and thus are present in the sample. In one well of a multi-well plate, one places the primers and probes for the three layers (Borrelial, Rickettsiales, and Babesial) as well as the primers and probes for the endogenous internal positive control (NIPcK9 if the sample is obtain from a dog) (thus, each well contains 4 layers). FIG. 1A shows the names and sequences for the forward and reverse primers, the probes, and the amplicons for each pathogen in the Borrelial Layer. In this example, the Borrelial Layer probes use FAM/BHQ1 (fluorescein (5' reporter) and Black Hole Quencher 1™ (3' acceptor)) fluorescent label. FIG. 1B shows the names and sequences for the forward and reverse primers, the probes, and the amplicons for each pathogen in the Rickettsiales Layer. In this example, the Rickettsiales Layer probes use CFO560/BHQ1 (Cal-Fluor Orange (5' reporter) and Black Hole Quencher 1™ (3' acceptor)) fluorescent label. FIG. 1C shows the names and sequences for the two forward primers, one reverse primer, one probe, and amplicon that are using to determine if any of the three *Babesia* species identified by the Babesial Layer are present in the sample. In this example, the Babesial Layer probe uses Q670/BHQ2 (Quasar™ 670 (5' reporter) and Black Hole Quencher 2™ (3' acceptor)) fluorescent label. If one is testing samples from dogs, one can use NIPcK9, a canine mitochondrial DNA sequence, as a positive internal amplification control for this LayerPlex qPCR assay and to confirm that the sample was obtained from a dog because the sample should be positive for the NIPcK9 amplicon. For NIPcK9, the probe and the forward and reverse primers which generate an amplicon are shown in FIG. 1C. In this example, one can use TAMRA/BHQ2 (tetramethylrhodamine (5' reporter) and Black Hole Quencher 2™ (3' acceptor)) fluorescent label for NIPcK9. One also uses a positive internal amplification control plasmid, referred to as Tick10.PAC (see FIGS. 2A-2C), which contains each of the amplicons generated by the above discussed primers. The sequences of Tick10.PAC (SEQ ID NO: 68) and NIPcK9 amplicon (SEQ ID NO: 45) can be cloned into any appropriate plasmid such as pUC57. One can use bodily fluids and/or tissue samples from a mammal or a tick with this LayerPlex qPCR diagnostic assay. To isolate the DNA from the sample, one uses the methods described above.

For the qPCR assays, Applied Biosystems™ 7500 Fast Real-Time PCR System (ThermoFisher Scientific, Waltham, MA) and MicroAmp™ Fast Optical 96-Well Reaction Plate and optical plate seals (ThermoFisher Scientific, Waltham, MA) are used. Stock solutions of the primers/probes and the plasmids are made using nuclease free water and IDTE pH 8.0. The Tick10.PAC and NIPcK9 plasmids are diluted to 1,000 copies and 10,000 copies which generate a Cq value of 23-32 and 20-29, respectively. Path-ID qPCR Master Mix (ThermoFisher Scientific, Waltham, MA) is used. A 12.5× LayerPlex and NIPcK9 primers and probes mix is generated that contains all of the above described primers and probes for the Borrelial, Rickettsiales, and Babesial layers and the positive control (NIPcK9). qPCR master mix (17 µl) is generated by combining 2.5 µl nuclease-free water, 12.5 µl 2× Path-ID qPCR Master Mix, and 2.0 µl 12.5× LayerPlex and NIPcK9 primers and probes mix. The concentrations of NIPcK9 primers and probe are 0.4 µM. The concentrations of all other primers are 5.6 µM, and the concentrations of all other probes are 1.6 µM. 17 µl qPCR master mix is distributed into qPCR plate wells. 8 µl of sample DNA in water (at concentration of between 2 ng DNA/µl and 100 ng DNA/µl water) are added to the wells, mixed, and plates sealed. qPCR cycles are 95.0° C. for 10 minutes (Stage 1, denaturation); 95.0° C. for 1 second and 60.0° C. for 30 seconds with 40 repetitions (Stage 2, annealing & extension). Fluorescence data is acquired at the conclusion of each annealing step to measure amplification quantity which is used to generate the Cq value at the conclusion of the final extension cycle.

For the Borrelial Layer (i.e., to detect *Borrelia* spp. in the sample), one uses the following primer sets (forward and reverse) to generate the indicated amplicon and probes containing the indicated oligonucleotide sequence:
(i) SEQ ID NOs: 1 and 2 to generate a 75 bp *B. burgdorferi* amplicon (SEQ ID NO: 4) and use SEQ ID NO: 3 for the probe,
(ii) SEQ ID NOs: 5 and 7 to generate a 117 bp *B. hermsii* amplicon (SEQ ID NO: 9) and use SEQ ID NO: 8 for the probe,
(iii) SEQ ID NOs: 6 and 7 to generate a 119 bp *B. hermsii* amplicon (SEQ ID NO: 10) and use SEQ ID NO: 8 for the probe,
(iv) SEQ ID NOs: 11 and 13 to generate a 142 bp *B. turicatae* amplicon (SEQ ID NO: 15) and use SEQ ID NO: 14 for the probe,
(v) SEQ ID NOs: 12 and 13 to generate a 139 bp *B. turicatae* amplicon (SEQ ID NO: 16) and use SEQ ID NO: 14 for the probe, and
(vi) SEQ ID NOs: 17 and 18 to generate a 117 bp *B. parkeri* amplicon (SEQ ID NO: 20) and use SEQ ID NO: 19 for the probe.

These Borrelial Layer probes contain 5'-FAM/BHQ1-3' as the fluorescent label and quencher.

For the Rickettsiales Layer (i.e., to detect *Rickettsia* spp. or *Anaplasma* spp. or *Ehrlichia* spp. in the sample), one uses the following primer sets (forward and reverse) to generate the indicated amplicon and probes containing the indicated oligonucleotide sequence:

(vii) SEQ ID NOs: 21 and 22 to generate a 159 bp *R. rickettsii* amplicon (SEQ ID NO: 24) and use SEQ ID NO: 23 for the probe, (viii) SEQ ID NOs: 25 and 26 to generate a 95 bp *A. phagocytophilum* amplicon (SEQ ID NO: 28) and use SEQ ID NO: 27 for the probe, (ix) SEQ ID NOs: 29 and 30 to generate a 113 bp *E. canis* amplicon (SEQ ID NO: 32) and use SEQ ID NO: 31 for the probe, (x) SEQ ID NOs: 33 and 34 to generate a 111 bp *E. chaffeensis* amplicon (SEQ ID NO: 35) and use SEQ ID NO: 31 for the probe, and (xi) SEQ ID NOs: 36 and 34 to generate a 114 bp *E. ewingii* amplicon (SEQ ID NO: 37) and use SEQ ID NO: 31 for the probe.

These Rickettsiales Layer probes contain 5'-CFO560/BHQ1-3' as the fluorescent label and quencher.

For the Babesial Layer (i.e., to detect *Babesia* spp. in the sample), one uses the following primer sets (forward and reverse) to generate the indicated amplicon and probes containing the indicated oligonucleotide sequence:

(xii) SEQ ID NOs: 38 and 39 to generate a 94 bp *Babesia* spp. amplicon (SEQ ID NO: 41) and use SEQ ID NO: 40 for the probe, and (xiii) SEQ ID NOs: 77 and 39 to generate a 93 bp *Babesia* spp. amplicon (SEQ ID NO: 78) and use SEQ ID NO: 40 for the probe.

These Babesial Layer probes contains 5'-Q670/BHQ2-3' as the fluorescent label and quencher.

For this LayerPlex qPCR assay, for an amplification control one uses (1) a plasmid that contains canine specific NIPcK9 amplicon (SEQ ID NO: 45) which is generated using primer set SEQ ID NOs: 42 and 43 and using probe (SEQ ID NO: 44) containing 5'-TAMRA/BHQ2-3'; and (2) Tick10.PAC (SEQ ID NO: 68) which contains the sequence for each amplicon in the Borrelial Layer, Rickettsiales Layer, and Babesial Layer, as well as additional nucleotides for ease of cloning.

A particular layer from this LayerPlex qPCR is positive for a microorganism within that layer if the Cq value for that layer is 36.0 or less for all types of samples, then the sample is positive for at least one microorganism in that layer; when the Cq value for a layer is between 36.1 and 38.0, then the sample is suspect positive for at least one microorganism within that layer (and one can repeat the qPCR assay using ¼ or ½ of the sample size); and when the Cq value for a layer is 38.1 or greater, then the sample is negative for any of the possible microorganism within that layer; so long as the amplification controls' Cq values are as follows: (1) If one used NIPcK9 for amplification control and to conclusively identify the sample as contained dog mDNA, then NIPcK9's Cq value is 25.0 or less for a dog blood sample or 36.0 or less for any other type of sample from a dog, the LayerPlex assay is accurate. (2) If one is using Tick10.PAC plasmid as an amplification control (instead of NIPcK9), then Tick10.PAC's Cq value is 36.0 or less, regardless of the type of sample being tested, the LayerPlex assay is accurate. But, if the Cq value for NIPcK9 and/or Tick10.PAC indicates an invalid result, then one should repeat the LayerPlex qPCR assay by using ¼ or ½ sample volume.

When one wants to know the specific microorganism present in a positive layer, one can then conduct individual, distinct qPCR assays for that positive layer. The probes for these individual and distinct qPCR assays use the same fluorescent labels and quenchers that they used for the LayerPlex PCR test because each qPCR will be in different wells of a plate and one can distinguish which wells are positive and which are negative.

To identify the species within the Borrelial Layer, one uses the following primer sets to generate the indicated amplicon and probes having the indicated oligonucleotide sequence:

(i) SEQ ID NOs: 1 and 2 to generate a 75 bp *B. burgdorferi* amplicon (SEQ ID NO: 4) and use SEQ ID NO: 3 for the probe's oligonucleotide, (xiv) SEQ ID NOs: 46 and 47 to generate a 135 bp *B. hermsii* gene group I (GG I) amplicon (SEQ ID NO: 48) and use SEQ ID NO: 8 for the probe's oligonucleotide, (xv) SEQ ID NOs: 49 and 50 to generate a 136 bp *B. hermsii* gene group II (GG II) amplicon (SEQ ID NO: 51) and use SEQ ID NO: 8 for the probe's oligonucleotide, (iv) SEQ ID NOs: 11 and 13 to generate a 142 bp *B. turicatae* amplicon (SEQ ID NO: 15) and use SEQ ID NO: 14 for the probe's oligonucleotide, (v) SEQ ID NOs: 12 and 13 to generate a 139 bp *B. turicatae* amplicon (SEQ ID NO: 16) and use SEQ ID NO: 14 for the probe's oligonucleotide, and (vi) SEQ ID NOs: 17 and 18 to generate a 117 bp *B. parkeri* amplicon (SEQ ID NO: 20) and use SEQ ID NO: 19 for the probe's oligonucleotide.

To identify the species within the Rickettsiales Layer, one uses the following primer sets to generate the indicated amplicon and probes having the indicated oligonucleotide sequence:

(vii) SEQ ID NOs: 21 and 22 to generate a 159 bp *R. rickettsii* amplicon (SEQ ID NO: 24) and use SEQ ID NO: 23 for the probe's oligonucleotide, (viii) SEQ ID NOs: 25 and 26 to generate a 95 bp *A. phagocytophilum* amplicon (SEQ ID NO: 28) and use SEQ ID NO: 27 for the probe's oligonucleotide, (ix) SEQ ID NOs: 29 and 30 to generate a 113 bp *E. canis* amplicon (SEQ ID NO: 32) and use SEQ ID NO: 31 for the probe's oligonucleotide, (x) SEQ ID NOs: 33 and 34 to generate a 111 bp *E. chaffeensis* amplicon (SEQ ID NO: 35) and use SEQ ID NO: 31 for the probe's oligonucleotide; and (xi) SEQ ID NOs: 36 and 34 to generate a 114 bp *E. ewingii* amplicon (SEQ ID NO: 37) and use SEQ ID NO: 31 for the probe's oligonucleotide.

To identify the species within the Babesial Layer, one uses the following primer sets to generate the indicated amplicon and probes having the indicated oligonucleotide sequence:

(xvi) SEQ ID NOs: 52 and 53 to generate a 81 bp *B. canis vogeli* amplicon (SEQ ID NO: 55), and use SEQ ID NO: 54 for the probe's oligonucleotide or (xvii) SEQ ID NOs: 56 and 57 to generate a 73 bp *B. canis vogeli* amplicon (SEQ ID NO: 59), and use SEQ ID NO: 58 for the probe's oligonucleotide, (xviii) SEQ ID NOs: 60 and 61 to generate a 73 bp *B. gibsoni* amplicon (SEQ ID NO: 63), and use SEQ ID NO: 62 for the probe's oligonucleotide, and (xix) SEQ ID NOs: 64 and 65 to generate a 76 bp *B. conradae* amplicon (SEQ ID NO: 67), and use SEQ ID NO: 66 for the probe's oligonucleotide.

One also conducts qPCR assays to confirm that the sample is obtained from the animal one believes from which the sample was obtain and an amplification control for the tick-borne pathogen sequences. If the sample was believed obtain from a canine, one uses a plasmid that contains canine specific NIPcK9 amplicon (SEQ ID NO: 45) which is generated using SEQ ID NO: 42 and 43 (forward and reverse primers) and using probe (SEQ ID NO: 44) containing 5'-TAMRA/BHQ2-3'. For the microorganism amplification control, one uses a plasmid containing Tick10.PAC (SEQ ID NO: 68) which contains the sequence for each amplicon in the Borrelial Layer, Rickettsiales Layer, and Babesial Layer as well as additional nucleotides for ease of cloning.

For all of these individual qPCR assays to detect and identify the particular species of microorganism(s) present in a sample, a sample is positive for the microorganism when the Cq value for a qPCR assay is 36.0 or less. When the Cq value of a qPCR assay is between 36.1 and 38.0, then the sample is suspect positive, and one can repeat the qPCR assay using ½ or ⅟2 of the sample size. When the Cq value of a qPCR assay is 38.1 or greater, then the sample is negative; so long as the amplification controls' Cq values are as follows: (1) If one uses NIPcK9, then NIPcK9's Cq value is 25.0 or less for a dog blood sample or 36.0 or less for any other type of sample from a dog, the qPCR assay is accurate. (2) If one uses Tick10.PAC plasmid, then Tick10.PAC's Cq value is 36.0 or less, regardless of the type of sample being tested, the qPCR assay is accurate. But, if the Cq value for NIPcK9 and/or Tick10.PAC indicates an invalid result, then one should repeat the qPCR assay by using ½ or ⅟3 sample volume.

Tables 10, 11, 12, and 13, below, details the specificity of each primer set in the LayerPlex PCR assay for the Rickettsial Layer (Table 10), Borrelial Layer (Table 11), and Babesial Layer (Table 12), and the primer set for the NIPcK9 PCR assay (Table 13). Each specific species targeted by each primer set for each layer of the LayerPlex PCR is detailed along the x-axis, and all closely related species that were tested for potential cross amplification are detailed along the y-axis. The tables demonstrate that only the intended species were detected by each primer set in each respective LayerPlex PCR, and no closely related species were subsequently detected. See FIGS. 1A-1D for the primer sets used for the species listed in the top row in the tables below.

TABLE 10

Rickettsial Assays Specificity

|  | E. canis | E. chaffeensis | E. ewingii | A. phagocytophilum | R. rickettsii |
|---|---|---|---|---|---|
| E. canis | Positive | Negative | Negative | Negative | Negative |
| E. chaffeensis | Negative | Positive | Negative | Negative | Negative |
| E. ewingii | Negative | Negative | Positive | Negative | Negative |
| E. ruminantium | Negative | Negative | Negative | Negative | Negative |
| E. muris | Negative | Negative | Negative | Negative | Negative |
| A. phagocytophilum | Negative | Negative | Negative | Positive | Negative |
| A. marginale | Negative | Negative | Negative | Negative | Negative |
| A. ovis | Negative | Negative | Negative | Negative | Negative |
| A. centrale | Negative | Negative | Negative | Negative | Negative |
| R. rickettsii | Negative | Negative | Negative | Negative | Positive |

TABLE 11

Borrelial Assays Specificity

|  | B. hermsii GGI | B. hermsii GGII | B. parkeri | B. turicatae | B. burgdorferi |
|---|---|---|---|---|---|
| B. hermsii GGI | Positive | Negative | Negative | Negative | Negative |
| B. hermsii GGII | Negative | Positive | Negative | Negative | Negative |
| B. parkeri | Negative | Negative | Positive | Negative | Negative |
| B. turicatae | Negative | Negative | Negative | Positive | Negative |
| B. miyamotoi | Negative | Negative | Negative | Negative | Negative |
| B. coriaceae | Negative | Negative | Negative | Negative | Negative |
| B. anserina | Negative | Negative | Negative | Negative | Negative |
| B. crocidurae | Negative | Negative | Negative | Negative | Negative |
| B. recurrentis | Negative | Negative | Negative | Negative | Negative |
| B. burgdorferi | Negative | Negative | Negative | Negative | Positive |
| B. garinii | Negative | Negative | Negative | Negative | Negative |
| B. afzelii | Negative | Negative | Negative | Negative | Negative |

TABLE 12

Babesial Assay Specificity

|  | Babesia Assay |
|---|---|
| B. canis vogeli | Positive |
| B. canis canis | Positive |
| B. canis rossi | Positive |
| B. gibsoni | Positive |
| B. caballi | Positive |
| B. odocoilei | Positive |
| B. divergens | Positive |
| B. bigemina | Positive |
| B. microti | Negative |
| B. bovis | Negative |
| B. duncani | Negative |
| B. conradae | Negative |
| T. equi | Negative |

TABLE 13

NIPcK9 Assay Specificity

|  | NIPcK9 |
|---|---|
| Canis lupus familiaris (dog) | Positive |
| Canis lupus (gray-wolf) | Positive |
| Canis latrans (coyote) | Positive |
| Equus caballus (horse) | Negative |
| Felis catus (cat) | Negative |
| Capra aegagrus hircus (goat) | Negative |
| Ovis aries (sheep) | Negative |
| Odocoileus virginianus (white-tailed deer) | Negative |
| Mephitis mephitis (skunk) | Negative |

TABLE 13-continued

NIPcK9 Assay Specificity

| | NIPcK9 |
|---|---|
| Bos taurus (cow) | Negative |
| Sus scrofa (pig) | Negative |
| Gallus gallus (chicken) | Negative |
| Procyon lotor (raccoon) | Negative |
| Vulpes vulpes (fox) | Negative |

Tables 14, 15, 16, and 17 below, demonstrate the sensitivity analysis for the LayerPlex PCR assay, and the LayerPlex PCR assay's robustness for the target microorganisms using the primers discussed above each layer. The efficiency, $R^2$, and limit of detection data for each assay are provided.

TABLE 14

| qPCR Assays | Efficiency | $R^2$ | Limit of detection (copy #) |
|---|---|---|---|
| B. hermsii | 99% | 1.000 | ~16 |
| B. turicatae | 101% | 0.988 | ~16 |
| B. parkeri | 99% | 0.998 | ~16 |
| B. burgdorferi | 97% | 0.996 | ~16 |

TABLE 15

| qPCR Assays | Efficiency | $R^2$ | Limit of detection (copy #) |
|---|---|---|---|
| E. canis | 97% | 0.996 | ~16 |
| E. ewingii | 91% | 1.000 | ~16 |
| E. chaffeensis | 94% | 0.997 | ~16 |
| A. phagocytophilum | 95% | 0.996 | ~16 |
| R. rickettsii | 97% | 0.995 | ~16 |

TABLE 16

| qPCR Assays | Efficiency | $R^2$ | Limit of detection (copy #) |
|---|---|---|---|
| Babesia spp. | 91% | 0.995 | ~16 |

TABLE 17

| qPCR Assays | Efficiency | $R^2$ | Limit of detection (copy #) |
|---|---|---|---|
| Borrelial Layer | 105% | 0.998 | ~16 |
| Rickettsial Layer | 104% | 0.999 | ~16 |
| Babesial Layer | 105% | 0.999 | ~16 |

Table 18, below, shows the results of testing 654 samples with the Borrelial and Rickettsial layers of the LayerPlex qPCR assay to screen for the following pathogens: B. burgdorferi, B. hermsii, B. turicatae, B. parkeri, R. ricketsii, E. canis, E. chaffeensis, E. ewingii, and A. phagocytophilum.

TABLE 18

| | Rickettsial layer | | | Borrelial layer | | |
|---|---|---|---|---|---|---|
| Sample | + | − | % positive | + | − | % positive |
| Human blood | 2 | 165 | 1.2 | 9 | 115 | 7.5 |
| Domestic dog blood | 47 | 118 | 28.4 | 3 | 164 | 2.67 |
| Ticks from domestic dogs | 11 | 154 | 6.6 | 15 | 138 | 11.19 |
| Ticks from humans | 0 | 0 | 0 | 1 | 16 | 6.2 |
| White tailed deer (liver/spleen) | 14 | 33 | 29.7 | 0 | 0 | 0 |
| Temazate deer (liver/spleen) | 2 | 2 | 50 | 0 | 0 | 0 |
| Feral hog (liver/spleen) | 1 | 1 | 50 | 0 | 0 | 0 |
| Mexican badger (liver/spleen) | 0 | 0 | 0 | 1 | 1 | 50 |
| Ticks from deer | 3 | 63 | 5.4 | 1 | 65 | 1.5 |
| Ticks from weasel | 1 | 0 | 100 | 0 | 0 | 0 |
| Total | 81 | 573 | 12.38% | 30 | 624 | 4.59% |

A random subset of 94 samples were selected for species level identification. Of the 94 samples, 7 (7.4%) and 5 (5.3%) were detected as positive for Rickettsial and Borrelial Layers respectively. Further species level analysis revealed that of the Rickettsial Layer, 5 positives samples were determined to be positive for E. canis, 1 suspect positive for R. rickettsii, and 1 suspect positive for A. phagocytophilum. No samples were determined to be positive for E. ewingii or E. chaffeensis. The Borrelial Layer positive samples are pending species level identification. Out of the 654 samples tested by LayerPlex qPCR, 5 samples were positive for both Borrelial and Rickettsial layers and were subsequently suspected as co-infections of the respective microorganisms.

A random set of 22 blood samples deriving from dogs suspected of tick-borne infection were screened by the LayerPlex qPCR assay using the Borrelial, Rickettsial, and Babesial layers using the primers and probes in FIGS. 1A-1D. Then, the samples that tested positive for at least one layer was subjected to qPCR for the microorganisms within that layer using the primers and probes of FIGS. 1A-1D (but the probes contain different fluorescent molecules so that the microbial species could be distinguished from each other as discussed previously). The results revealed that 3 samples (13.6%) were positive for B. turicatae, 3 samples (13.6%) were positive for E. canis, 1 sample (4.5%) was positive for B. gibsoni, and zero samples were positive for B. hermsii, B. parkeri, B. burgdorferi, A. phagocytophilum, E. chaffeensis, E. ewingii, or R. rickettsii.

All patents, patent applications, provisional applications, and publications referred to or cited herein are incorporated by reference in their entirety, including all figures and tables, to the extent they are not inconsistent with the explicit teachings of this specification. Also, all non-patent publications referred to or cited herein are incorporated by reference in their entirety.

It should be understood that the examples and embodiments described herein are for illustrative purposes only and that various modifications or changes in light thereof will be suggested to persons skilled in the art and are to be included within the spirit and purview of this application and the scope of the appended claims. In addition, any elements or limitations of any invention or embodiment thereof disclosed herein can be combined with any and/or all other elements or limitations (individually or in any combination) or any other invention or embodiment thereof disclosed herein, and all such combinations are contemplated within the scope of the invention without limitation thereto.

We claim:

1. A kit for detecting *Borrelia* spp., *Rickettsia*-like bacteria, and *Babesia* spp. in a sample comprising:
   at least one primer set for detecting said *Borrelia* spp. comprising SEQ ID NOs: 1 and 2;
   at least one primer set for detecting said *Rickettsia*-like bacteria comprising SEQ ID NOs: 21 and 22;
   at least one primer set for detecting said *Babesia* spp. comprising SEQ ID NOs: 38 and 39,
   at least one labeled probe comprising SEQ ID NO: 3 for detecting the presence of at least one *Borrelia* spp. amplicon, at least one labeled probe comprising SEQ ID NO: 23 for detecting the presence of a *Rickettsia*-like bacteria amplicon, and at least one labeled probe comprising SEQ ID NO: 40 for detecting the presence of a *Babesia* spp. amplicon, said probes being labeled with a fluorescent label and a quencher,
   an amplification control DNA,
   instructions for using said primer sets, said probes and said amplification control DNA,
   optionally PCR reagents, and
   optionally reagents for isolating DNA from a sample.

2. The kit of claim 1, wherein the amplification control DNA comprises SEQ ID NO: 45 or 68.

3. The kit of claim 2, wherein the amplification control DNA is a plasmid comprising SEQ ID NO: 45 and the kit further comprises a canine specific primer set of SEQ ID NOs: 42 and 43 for the generation of a canine specific amplicon and a fluorescently labeled probe comprising SEQ ID NO: 44 for detecting said canine specific amplicon.

4. The kit of claim 1, wherein said kit further comprises PCR reagents.

5. The kit of claim 1, wherein said kit further comprises reagents for isolating DNA from a sample.

6. A method for detecting at least one tick-borne pathogen in a sample from a mammal comprising
   a) optionally, isolating DNA from said sample to provided isolated DNA;
   b) contacting said isolated DNA with a plurality of primer sets provided by a kit according to claim 1 and DNA polymerase to provide a first layer PCR mix, wherein said plurality of primer sets detect at least one tick-borne pathogen;
   c) performing PCR on said first layer PCR mix to generate at least one amplicon; and
   d) determining the identity and quantity of said generated at least one amplicon, wherein said at least one amplicon is specific for detecting said at least one tick-borne pathogen in said sample, the tick borne pathogens being *Borrelia* spp., *Rickettsia*-like bacteria, and/or *Babesia* spp., wherein
   said at least one primer set for detecting said *Borrelia* spp. comprises SEQ ID NOs: 1 and 2;
   said at least one primer set for detecting said *Rickettsia*-like bacteria comprises SEQ ID NOs: 21 and 22;
   said at least one primer set for detecting said *Babesia* spp. comprises SEQ ID NOs: 38 and 39; and
   said at least one labeled probe comprises SEQ ID NO: 3 for detecting the presence of at least one *Borrelia* spp. amplicon, at least one labeled probe comprises SEQ ID NO: 23 for detecting the presence of a *Rickettsia*-like bacteria amplicon, and at least one labeled probe comprises SEQ ID NO: 40 for detecting the presence of a *Babesia* spp. amplicon, said probes being labeled with a fluorescent label and a quencher.

7. The method of claim 6, wherein said sample is obtained from a canine, and the first layer mix further comprises an amplification control plasmid comprising SEQ ID NO: 45, and a canine specific primer set of SEQ ID NOs: 42 and 43 for the generation of a canine specific amplicon.

8. The method of claim 7, wherein the canine specific amplicon is detected using a probe comprising SEQ ID NO: 44.

* * * * *